Dec. 30, 1958  M. R. OSTROW  2,866,368
MACHINE FOR SAWING BUTTON BLANKS FROM SHEET MATERIAL
Filed March 27, 1956  12 Sheets-Sheet 1

INVENTOR
MILAN R. OSTROW
BY
Moses, Nolte, Crews & Berry
ATTORNEYS

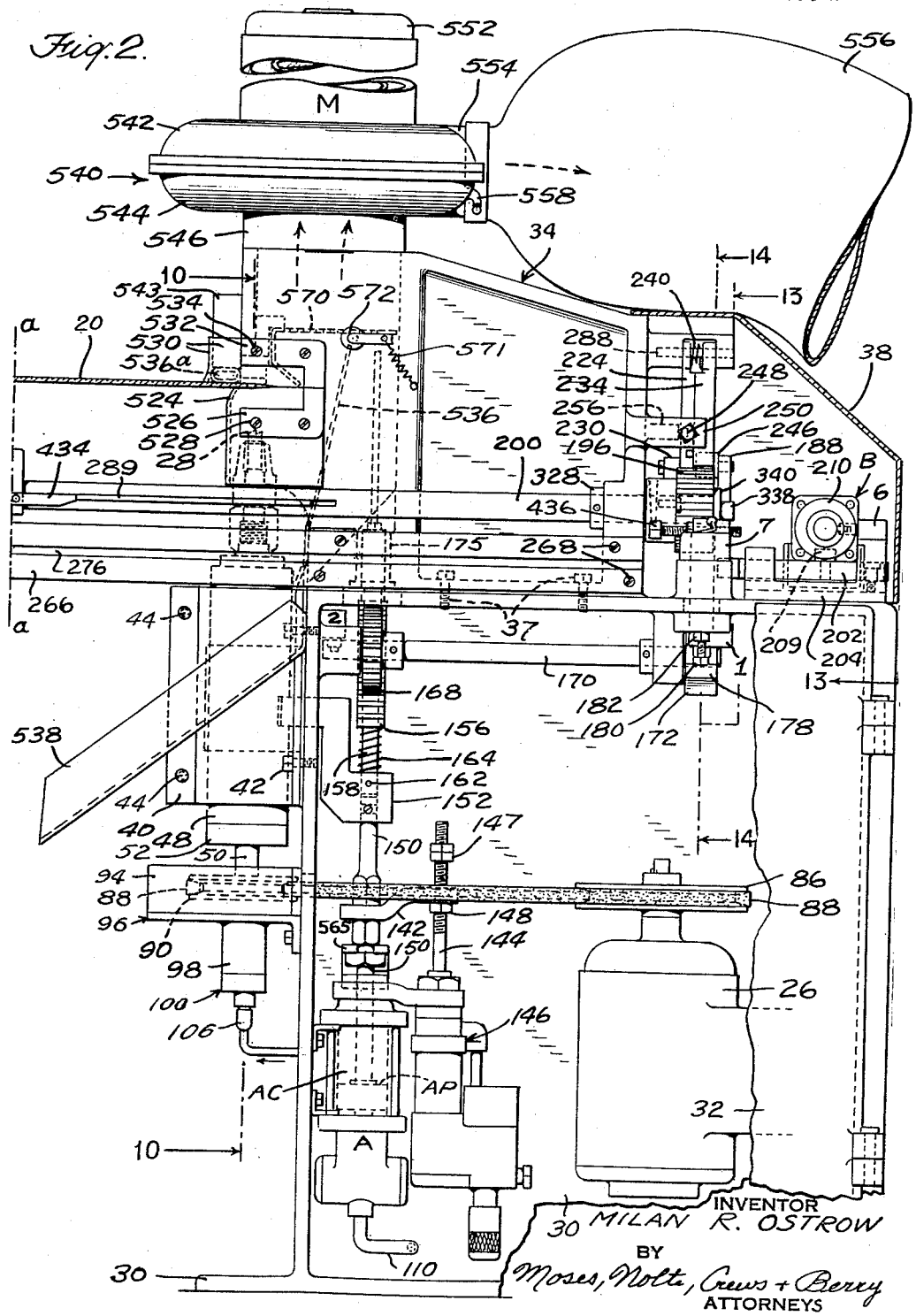

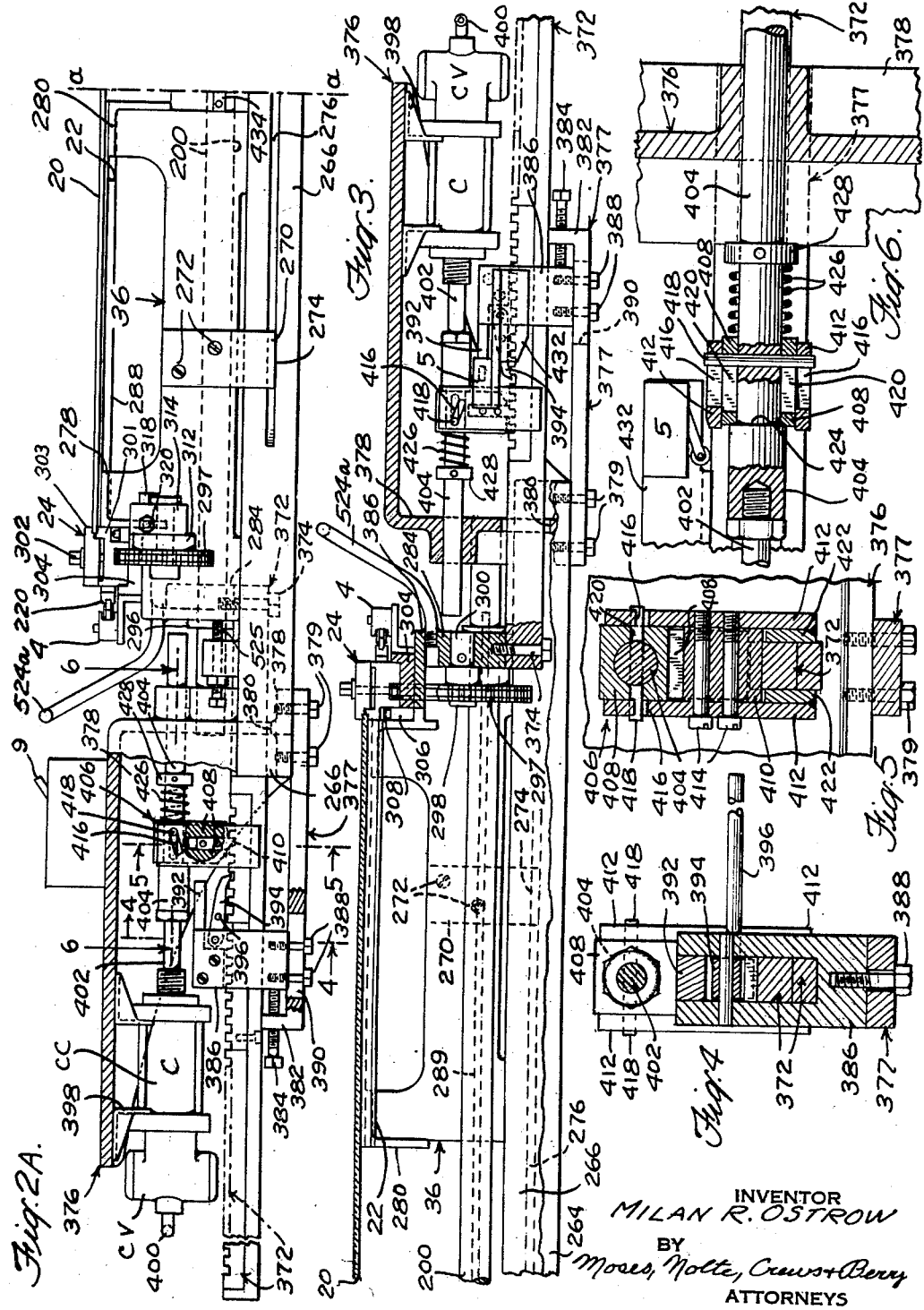

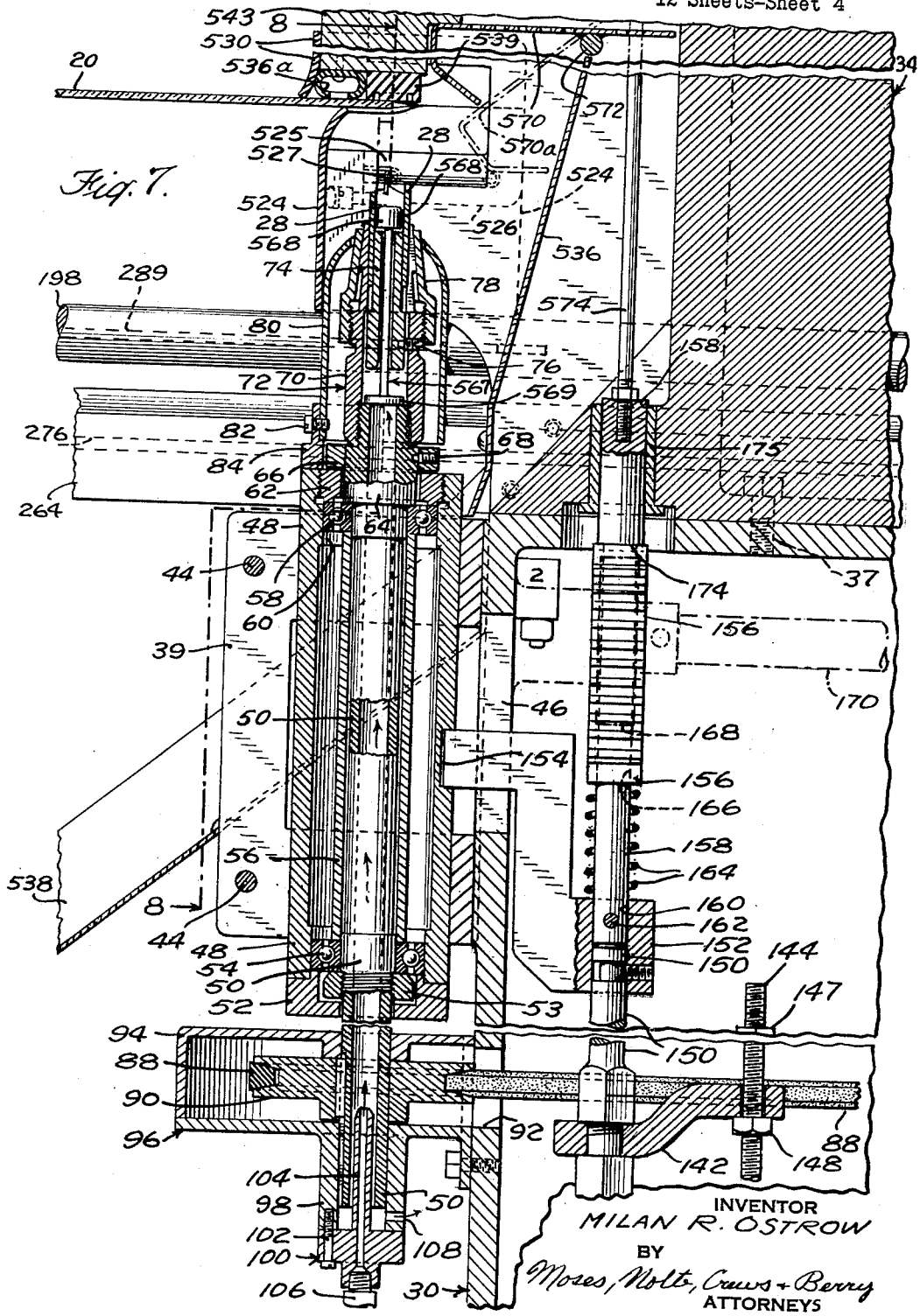

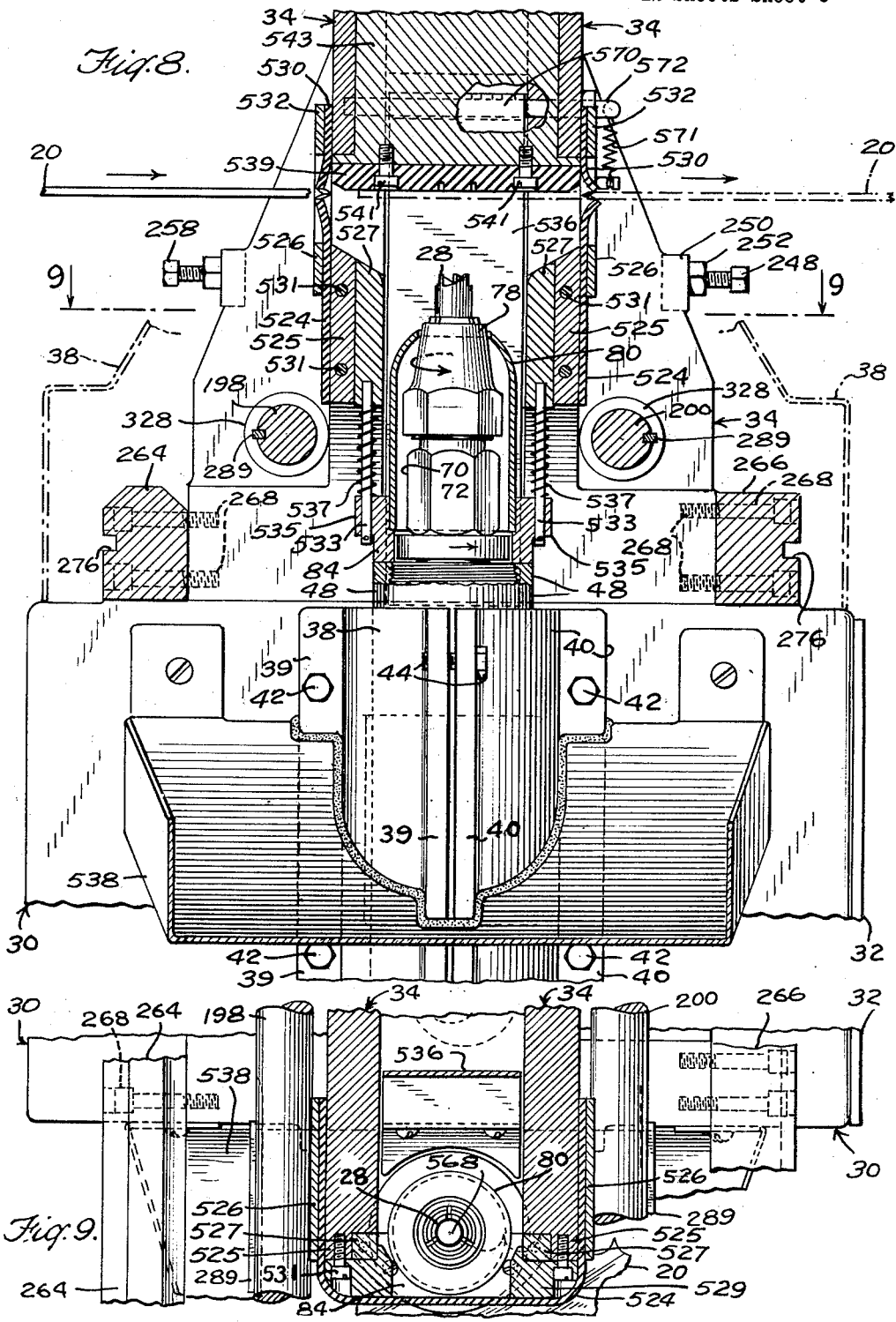

Dec. 30, 1958  M. R. OSTROW  2,866,368
MACHINE FOR SAWING BUTTON BLANKS FROM SHEET MATERIAL
Filed March 27, 1956  12 Sheets-Sheet 6

INVENTOR
MILAN R. OSTROW
BY
Moses, Nolte, Crews & Berry
ATTORNEYS

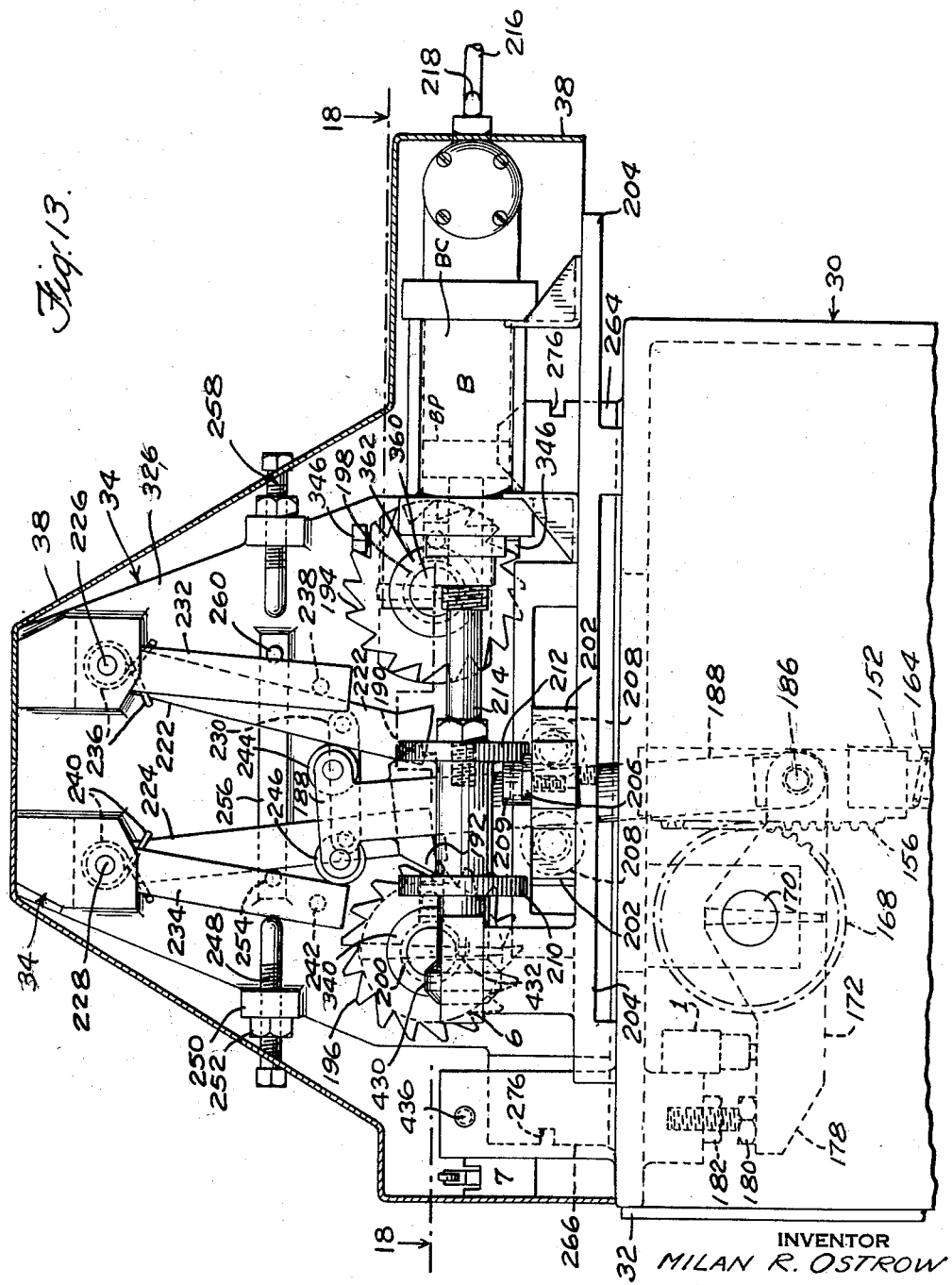

Dec. 30, 1958 M. R. OSTROW 2,866,368
MACHINE FOR SAWING BUTTON BLANKS FROM SHEET MATERIAL
Filed March 27, 1956 12 Sheets-Sheet 8
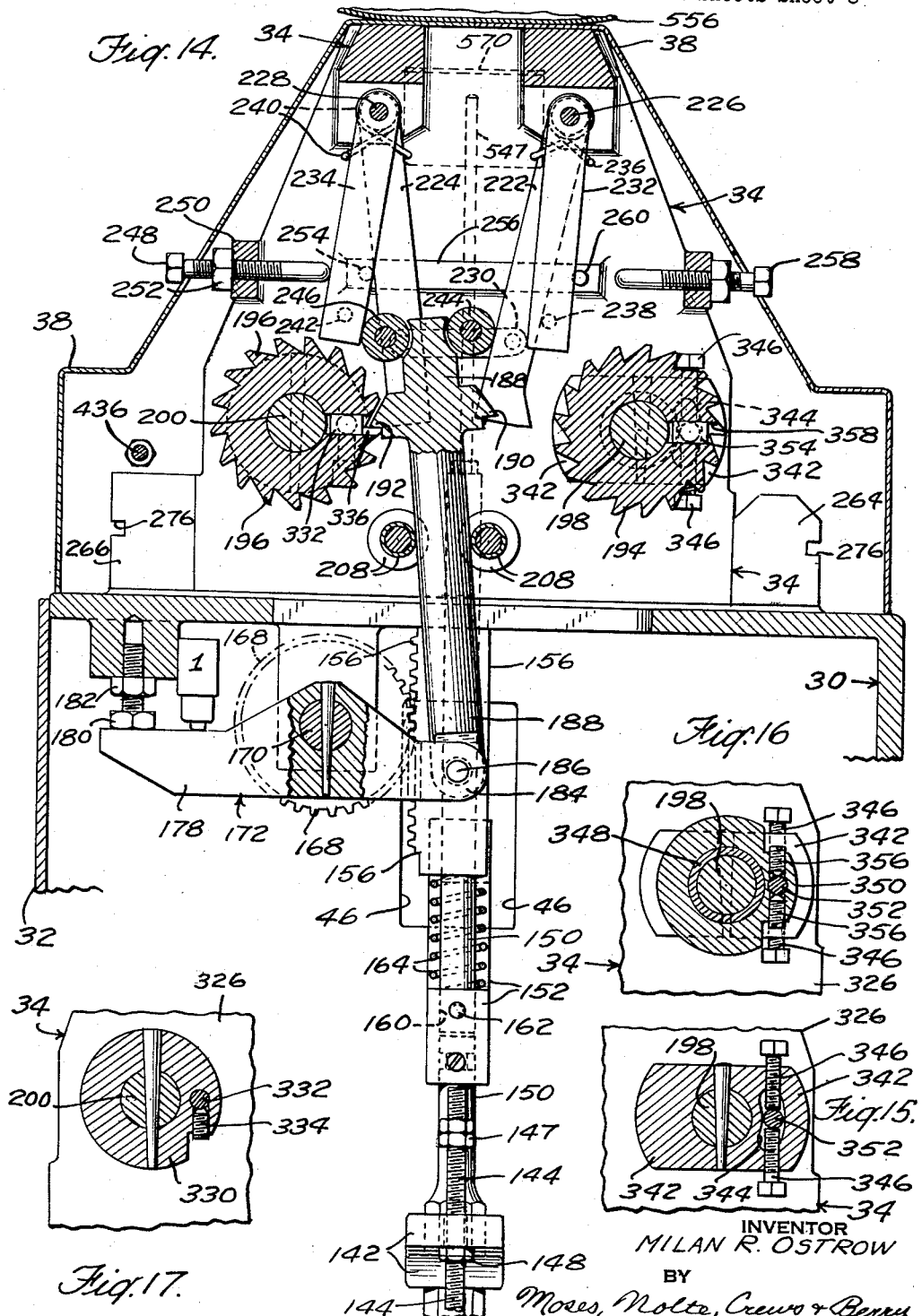
INVENTOR
MILAN R. OSTROW
BY
Moses, Nolte, Crews & Berry
ATTORNEYS Dec. 30, 1958 M. R. OSTROW 2,866,368
MACHINE FOR SAWING BUTTON BLANKS FROM SHEET MATERIAL
Filed March 27, 1956 12 Sheets-Sheet 9

INVENTOR
MILAN R. OSTROW
BY
Moses, Nolte, Crews & Berry
ATTORNEYS

Dec. 30, 1958     M. R. OSTROW     2,866,368
MACHINE FOR SAWING BUTTON BLANKS FROM SHEET MATERIAL
Filed March 27, 1956     12 Sheets-Sheet 10
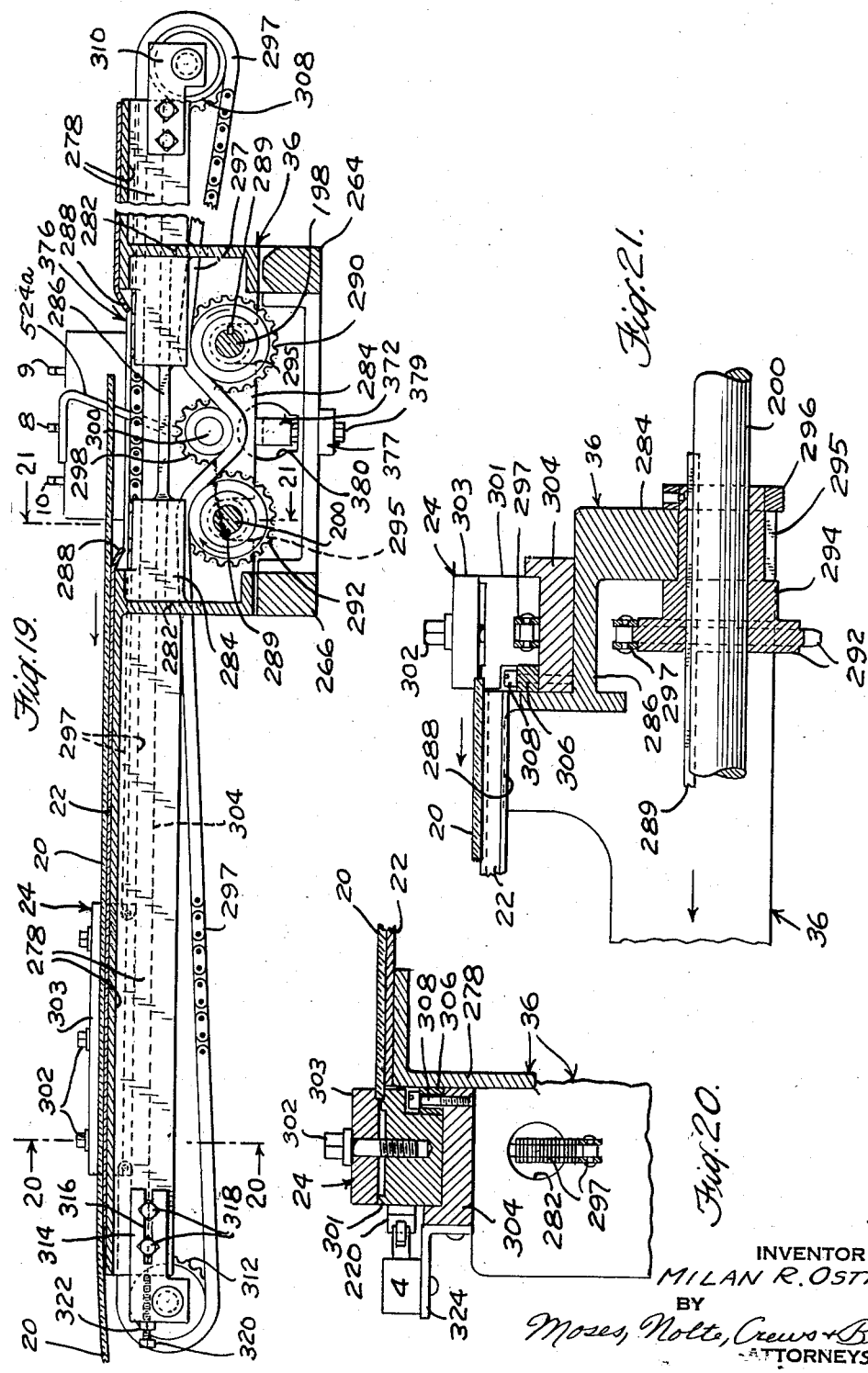
INVENTOR
MILAN R. OSTROW
BY
Moses, Nolte, Crews & Berry
ATTORNEYS

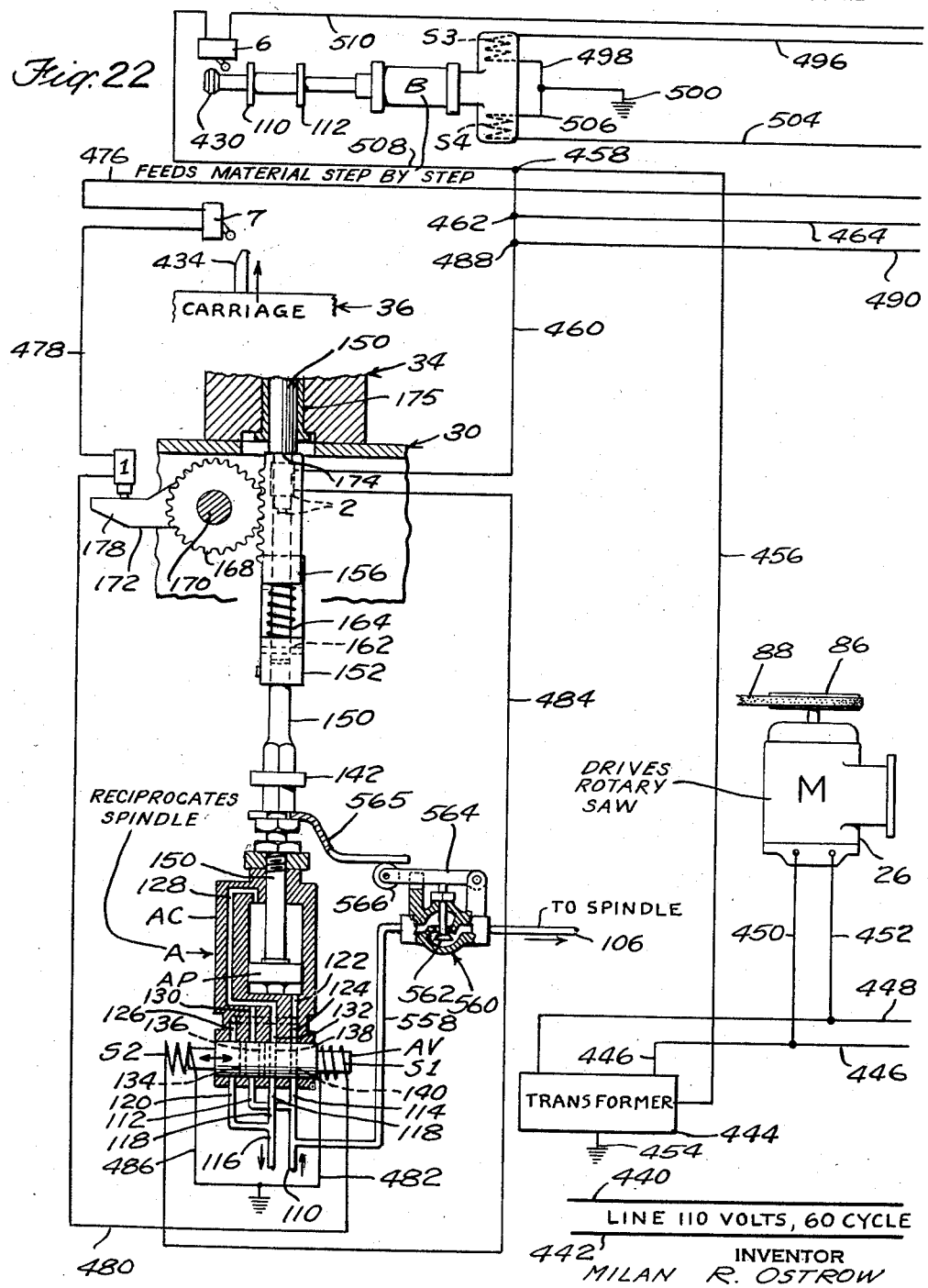

Dec. 30, 1958  M. R. OSTROW  2,866,368
MACHINE FOR SAWING BUTTON BLANKS FROM SHEET MATERIAL
Filed March 27, 1956  12 Sheets-Sheet 12

INVENTOR
MILAN R. OSTROW.
BY
Moses, Nolte, Crews + Berry
ATTORNEYS

United States Patent Office 2,866,368
Patented Dec. 30, 1958

2,866,368

MACHINE FOR SAWING BUTTON BLANKS FROM SHEET MATERIAL

Milan R. Ostrow, Fairlawn, N. J., assignor to Standard Button Machine Co., Inc., Paterson, N. J., a corporation of New Jersey Application March 27, 1956, Serial No. 574,175

33 Claims. (Cl. 79—16)

This invention relates to machines for cutting button blanks from sheet material.

It has been the practice heretofore to employ a power-driven tubular saw for cutting button blanks from sheet material. There has been no provision, however, for automatically feeding the sheet material to the saw, nor for automatically power feeding the saw into the material. Every step has required manual supervision, including both manual feeding of the saw into the material and the locating of the cut relative to other cuts according to the judgment of the operator.

It is the primary object of the present invention to provide an organized machine employing a tubular saw which will act automatically to cut button blanks from a large sheet until the sheet is exhausted. This is done in a manner which utilizes the material with substantially maximum efficiency.

To the accomplishment of these ends it is a feature that a work carrier is provided which is automatically fed in one direction step by step in alternation with the operation of a tubular saw until a complete row of cuttings has been effected, and is then fed crosswise a single step and similarly fed lengthwise in the reverse direction for the cutting of a second row of blanks. This is continued until the entire sheet is exhausted, whereupon the machine automatically comes to rest.

It is important that the button material, which is quite expensive, be utilized efficiently. To this end it is a feature that the blank feeding means is capable of adjustment to produce the desired feeding steps throughout a wide range so that buttons of various sizes can be cut without waste, the length of a step being desirably not less than the sum of the internal and external radii of the tubular saw chosen for use and not more than the external diameter of the saw.

By this arrangement the material is not only utilized efficiently, but a further advantage is realized in that the sheet is reduced, row by row, to button blanks, shavings and small fragments. The result is that as the sheet is progressed rearward from row to row, there is no skeletonized residue of the sheet to progress farther and farther to the rear. The new rear edge of the remaining sheet at the start of each row is in substantially the same position occupied by the former rear edge at the start of the preceding row. This avoids the necessity of providing an extensive overhang for the head portion of the machine.

In this same connection it is important that the cut areas of each row be staggered relative to their neighbors of adjacent rows so that the cut areas of one row may be caused to fit partially into the spaces between the cut areas of the neighboring rows. In other words, each cut area (having a diameter equal to the outside diameter of the saw) should overlap two cut areas of each adjacent row and two cut areas of its own row so that a regular hexagonal disposition of cutting centers will be produced. In order that this kind of feed may be achieved, provision is made, according to the invention, for feeding the sheet in one direction a half step out of phase with the feeding in the opposite direction.

It is a further feature that provision is made for automatically feeding the sheet of button material from row to row through a wide range of selected steps in accordance with the size of button blank to be cut.

It is a further important feature that the work sheet is fixed in a positively driven clamp so that all feeding of the work sheet is under positive control.

In accordance with another feature, provision is made for adjusting the time allowed to each cut in accordance with the requirements of material of varying hardness, the size of the blanks to be cut, and the sharpness of the saw.

It is also a feature that the sheet feeding mechanism is automatically synchronized with the action of the saw to feed the sheet a step during retractive movement of the saw and after the saw has moved clear of the work.

In view of the variables involved there is no fixed time for the consumption of a sheet of button material. In a typical case, however, a single sheet may last for about one hour. Because the operation is fully automatic, the operator is only required at the end of the complete sheet cutting cycle to insert a new sheet of material and set the machine into operation. Since this requires only a very small part of the complete sheet cutting cycle it is evident that a single operator can supervise and supply many machines (twenty to thirty).

It is still another feature that provision is made of a vacuum system for automatically pneumatically sucking away the shavings, dust and chips and collecting them in a bag in accordance with the familiar principle of the domestic vacuum cleaner. It is a very important point that the cutting station is substantially fully enclosed, so that all the dust, chips and shavings can be collected. The waste plastic material, if allowed to come in contact with the moving parts, will be converted under pressure into a gummy paste and will result in machine stoppage.

It is a further feature that a blast of air under super-atmospheric pressure is shot through the tubular saw at the appropriate time in each cycle to effect ejection of the cut blank. The air blast serves also to assist in keeping the saw and the saw spindle free of dust and shavings.

It is a further feature that means is provided for supporting the sheet against yielding and holding the sheet against movement during cutting, the arrangement being such, however, that the sheet is released for unrestricted feeding movement between cutting operations.

A still further practical and advantageous feature of the invention has to do with provision of an interlock between the longitudinal feeding means and the manual retraction of the sheet carriage when a sheet has been completely consumed and a new sheet is to be put in its place. The arrangement compels the longitudinal feeding and the advance of the saw to be interrupted before the carriage can be retracted, and it compels re-locking of the carriage against retraction as an incident of re-starting the automatic feed.

It is also a point that the manual operating controls are all provided at the front of the machine in a confined area which is conveniently accessible to the operator.

The present machine is adapted to produce composition buttons of the highest quality because it is capable of acting upon the highest quality of sheet material. It can also be used to advantage for improving the quality of buttons which are customarily hot-stamped from material of secondary quality. The hot-stamped buttons shrink as they cool and present a poor appearance on that account. The same material can be sawed cold by the present machine more economically and efficiently than it can be hot-stamped under the practice of the prior art.

If desired, two or even more identical sheets can be clamped in the machine in registered relation so that two or more blanks will be cut in each cutting cycle.

Other objects and advantages will hereinafter appear.

In the drawing forming part of this specification,

Figure 2 is a fragmentary view in sectional side elevation showing the machine of Figure 1 as seen from the right end thereof;

Figure 2A is a view in side elevation of the forward portion of the machine, Figures 2 and 2A being complementary to one another so that when placed end to end they present a side view of substantially the complete machine;

Figure 3 is a fragmentary view in sectional side elevation of substantially the same portion of the machine as that shown in Figure 2A but in this instance the structure is viewed from the left of Figure 1;

Figure 4 is a detail view in vertical section taken upon the line 4—4 of Figure 2A, looking in the direction of the arrows;

Figure 5 is a fragmentary view in sectional elevation taken upon the line 5—5 of Figure 2A, looking in the direction of the arrows;

Figure 6 is a horizontal sectional view taken on the line 6—6 of Figure 2A, looking in the direction of the arrows;

Figure 7 is a longitudinal vertical fragmentary sectional view taken on the line 7—7 of Figure 1, looking in the direction of the arrows, the view being, however, on a considerably larger scale than Figure 1;

Figure 8 is a fragmentary sectional view taken upon the line 8—8 of Figure 7, looking in the direction of the arrows;

Figure 9 is a fragmentary horizontal plan view taken upon the line 9—9 of Figure 8, looking in the direction of the arrows;

Figure 13 is a fragmentary vertical sectional view taken upon the line 13—13 of Figure 2, looking in the direction of the arrows, the view being upon a considerably larger scale than Figure 2;

Figure 14 is a fragmentary transverse sectional view taken upon the line 14—14 of Figure 2, looking in the direction of the arrows, the view, however, being on a larger scale than Figure 2 and the same scale as Figure 13;

Figure 15 is a fragmentary detailed sectional view taken on the line 15—15 of Figure 18, looking in the direction of the arrows;

Figure 16 is a detailed fragmentary view taken on the line 16—16 of Figure 18, looking in the direction of the arrows;

Figure 17 is a fragmentary sectional view taken on the line 17—17 of Figure 18, looking in the direction of the arrows;

Figure 19 is a transverse vertical sectional view taken on the line 19—19 of Figure 1, looking in the direction of the arrows, the view, however, being on a larger scale than Figure 1;

Figure 20 is a fragmentary vertical sectional view taken on the line 20—20 of Figure 19, looking in the direction of the arrows, the view being on a larger scale than Figure 19;

Figure 21 is a fragmentary sectional view taken on the line 21—21 of Figure 19, looking in the direction of the arrows; and Figures 22 and 23 are complementary diagrammatic views of the wiring system of the machine with some of the mechanical parts also shown in fragmentary or complete form, some being shown in section and others being shown in elevation.

Figure 1:
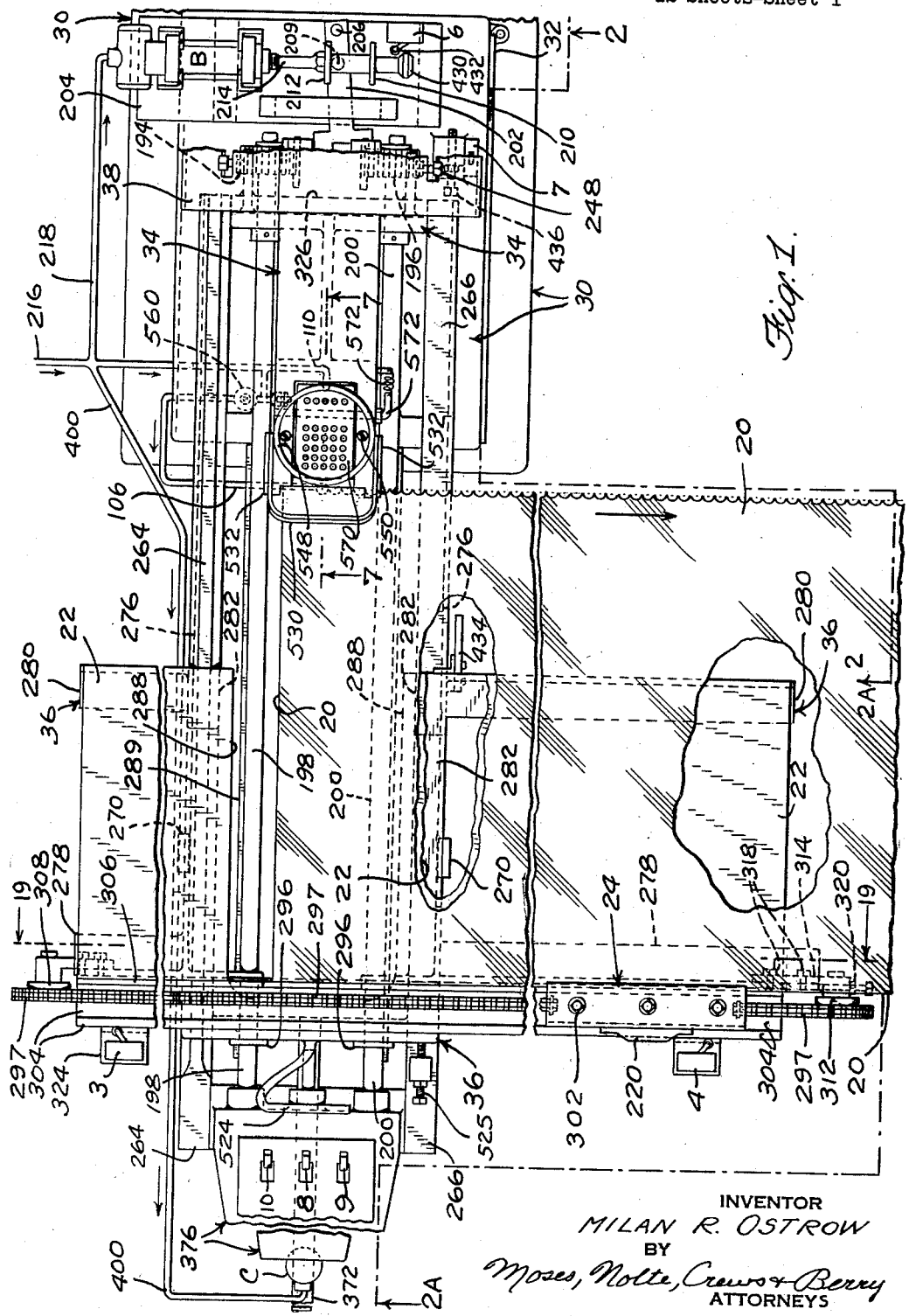
Figure 1 is a fragmentary plan view, partly broken away, and broken away intermediate its ends for compactness of illustration, showing a practical and advantageous illustrative machine which embodies features of the invention.

In order that the detailed description of the illustrative machine which is to follow may be generally understood as to purpose and principle of operation, the machine will first be described from the standpoint of the operator, and with reference only to the principal parts without any substantial detail.

Assuming that a certain button size has been selected and that certain interchangeable parts have been installed in the machine in harmony with the selected button size, the operator loads the machine by placing a plastic sheet 20 (see particularly Figures 1, 2 and 3) upon a table 22, and clamping the edge of the sheet positively in a holder 24. The operator then closes switch 8 (see Figure 23) to start the saw driving motor 26 (Figure 2) by which rotary movement is imparted to the saw 28. He next moves switch 10 to the upper position indicated in Figure 23 and then closes starting switch 9 to set the machine into operation. He is then free to load other similar machines or to remove finished blanks from such machines.

In the automatic cycle of the machine the holder 24 carries the sheet step by step from left to right or from right to left, the machine alternately cutting through the material and then feeding it a step until a complete row is cut along the edge of the sheet remote from the clamp. The first row cut is not a row of complete blanks but only of half blanks which are thrown away. This is done because it is desired to prepare the sheet with a serrated edge of such character that the cutting of each row of complete blanks will cause the material of that row to be completely reduced to button blanks, shavings, dust and chips. As the blanks are cut they fall down a chute and are collected in any suitable receptacle, such as a bucket or box.

When one row has been completely cut and the end of the sheet has moved clear of the cutter, the entire carriage 36 together with the table 22, the holder 24 and the sheet 20, is caused automatically to move over one row toward the rear of the machine, and the direction of feeding of the holder 24 is automatically reversed at the same time, so that the sheet is now fed step by step in the opposite direction for the cutting of a second row, the feeding steps again being alternated with the cutting operations. The mechanism is so contrived that the cutting centers of the second row are staggered with reference to the cutting centers of the first row. Each cutting center of any given row is equi-distant from the nearest cutting centers of each adjacent row.

This automatic operation is continued until the plastic sheet 20 is completely exhausted, except for the marginal portion at the clamped side which is too narrow to produce another row of blanks. At this point the machine automatically comes to rest with the saw 28 in its lowest position. The waste margin of the old sheet is unclamped and removed, the parts are restored to their initial starting positions, a new sheet is put in place and clamped, and the machine is again set into operation.

The complete loading of the machine occupies the operator for about three minutes. To finish a sheet completely the machine runs automatically for an hour to an hour and a half. One operator can, therefore, handle about twenty to thirty machines.

The illustrative button blank sawing machine is a unitary, self-contained mechanism which requires only to be set in place and connected to an electric power line and to a source of compressed air in order to be ready for operation.

The machine comprises a hollow base 30 (Figure 2) having an opening on one side which is normally closed by a hinged door 32. A head member 34 is fixed upon the base 30 by suitable means such as machine screws 37. A removable dust cover and guard 38 extends over the rear portion of the base and across the rear portion of the head 34.

Upon the forward outer face of the base 30 (Figures 2, 7 and 8), complementary, flanged guiding members 39 and 40 are suitably secured as by machine screws 42. The flanges of the members 39 and 40 are secured to one another by screws 44. The members 39 and 40 jointly define a vertically extending internally cylindrical guide which is open at the rear intermediate its ends for communication with the interior of the base 30 through an opening 46 (Figure 7) which is formed in the forward side of the base.

A sleeve 48 is mounted for vertical reciprocation in the guide formed by the members 39 and 40, the sleeve constituting a carrier and bearing support for a hollow rotary spindle 50. The spindle extends upward through a flanged cap 52 which is secured across the lower end of the guide 39 and 40. A lower ball bearing 54 is provided in the lower end of the sleeve 48, having the outer non-rotary race thereof supported on the flange of the cap 52 and having the inner, rotary race thereof secured between a collar 53 which is threaded on the spindle 50 and a spaced sleeve 56 which surrounds the spindle. An upper ball bearing 58 is also provided in the sleeve 48. The outer, non-rotary race of the upper bearing is supported upon an internal flange 60 of the sleeve 48, and the inner race is supported upon the upper end of the spacer sleeve 56. A retaining ring 62, threaded into the upper end of the sleeve 48, bears downward against the outer race of the bearing 58, and an enlarged shouldered portion 64 of the spindle 50 bears downward against the inner race of the bearing 58. An external collar 66 is affixed to the enlarged portion 64 of the spindle by means of a set screw 68.

An internally and externally threaded sleeve member 70 of a chuck 72 is secured onto the upper end of the spindle 50. The member 70 is tapered and split at its upper end. A bored, inner member 74 is fixed inside the member 70 by means of a set screw 76. An internally threaded chuck member 78 is screwed onto the sleeve member 70. The shank of the tubular saw 28 is clamped between the chuck members 70 and 74 by rotation of the chuck member 78. Saws of different diameters are provided for sawing button blanks of different diameters, but the saw shanks are all of the same external and internal diameters. A removable guard cover 80 is provided for the chuck for the purpose of preventing damage to cut button blanks by contact with the rapidly rotating chuck. The cover 80 is secured by a screw 82 to a bracket 84 which is secured upon the upper end of the non-rotary sleeve 48. When it is desired to change saws, the screw 82 is backed out of the cover 80, the cover is pushed up out of the way, and the chuck with the saw attached is removed in its entirety. A new saw is then substituted in the chuck and the chuck and cover are successively put back in their proper places.

As has been mentioned, the saw 28 is constantly rotated by the motor 26. The output shaft of motor 26 has fast upon it a pulley 86 which, through a belt 88, drives a pulley 90. The pulley 90 is slidably keyed on the spindle 50, serving to rotate the spindle without participating in the up and down motion of the spindle. The belt 88 travels from pulley to pulley through an opening 92 formed in the forward wall of the base 30. The pulley 90 is contained in a protective housing which is composed of complementary members 94 and 96 secured to the front of the base. It is restrained against vertical movement by said members.

The housing member 96 has a tubular extension 98 at its lower side in which the lower end of the spindle 50 is received and guided. A cap 100 is secured across the lower end of the tubular extension 98 by means of suitable fasteners 102 (one shown). The cap 100 has a hollow stem portion 104 which extends upward for a substantial distance into the hollow spindle 50, being spaced from the interior wall of the spindle. The cap 100 is also connected at its lower end with a compressed air hose 106. An air vent 108 is provided in the lower end of the tubular extension 98. The purpose of the compressed air connection and the vent will be explained at a subsequent point.

When the machine is in operation the spindle carrying sleeve 48 is automatically moved up and down in alternation, first to feed the saw 28 upward through plastic sheet 20 and then to retract the saw so that the sheet 20 can be fed to bring a fresh area into cutting position. This up and down movement of the sleeve 48, the spindle 50 and the saw 28 is automatically continued until the sheet 20 has been fully utilized. The up and down movement is effected and controlled by a pneumatic motor A and operating connections from the motor to the sleeve 48.

Details of the motor A are best seen in Figure 22. The motor comprises a cylinder AC and a piston AP therein. A compressed air supply pipe 110 has branches 112 and 114 which may be connected alternatively to the upper and lower ends, respectively, of the cylinder AC. A discharge pipe 116 has branches 118 and 120 through which connections may be alternatively established with the upper and lower ends of the cylinder AC, respectively. A single passage 122, having branches 124 and 126, is in constant communication with the lower end of the cylinder AC, while a single passage 128 having branches 130 and 132 is in constant communication with the upper end of the cylinder AC. A slide valve AV having four passages 134, 136, 138 and 140 through it controls the connections of the pipes 110 and 116 with the opposite ends of the cylinder AC.

As seen in Figure 22 the piston AP is just starting an upward stroke. The starting of the upward stroke was brought about by closing of a switch 1 at the completion of the downward stroke. This energized a solenoid S1 which pulled the valve AV to its right hand position. In this position compressed air pipe 110 is in communication with the lower end of the cylinder through branch 114, valve passage 140, branch passage 124 and passage 122, while the exhaust pipe 116 is in communication with the upper end of the cylinder through passage 128, branch 132, valve passage 138 and branch 118. The other valve passages and branch passages are inactive. In this condition of the valve the piston AP is driven upward until arrested or reversed. It will be held at its upper limit of movement by pneumatic pressure unless and until the position of the valve AV is reversed.

When the piston AP reaches its upper limit of movement the switch 2 is automatically closed. This causes solenoid S2 to be energized so that the valve AV is drawn to its left hand position with passage 134 aligned with branches 126 and 120 and with passage 136 aligned with the branches 112 and 130. This reverses the connections to the upper and lower ends of the cylinder AC, causing the upper end to be charged with compressed air and the lower end to be exhausted. This causes the piston AP to be driven to its lower limit of movement, at which point switch 1 is again automatically closed, causing a second upward stroke to be effected.

If the saw 28 were thrust upward against the work sheet with the full, unrestrained pneumatic force of the motor A, vibration and chattering would result. To prevent this the piston rod of the piston AP is connected through a rigid arm 142 to the piston rod 144 of a hydraulic dashpot device 146. This device is known commercially as a "Hydrocheck," being sold by the Bellows Company under that name. It is designed to transmit liquid freely in one direction but to interpose an adjustable retarding resistance to liquid flow in the opposite direction. Since it is desired to bring the "Hydrocheck" into play only in the latter portion of the upward movement of the piston AP, when the saw is about to engage the work sheet 20 or is in engagement with it, the arm 142 is caused freely to pass the piston rod 144. The arm 142 is, however, disposed between spaced upper and lower abutment nuts 147 and 148 which are threaded on the piston rod 144. As the arm is moved upward by the piston AP it moves freely until the lost motion is taken up and the upper nut 147 is encountered. The device 146 then applies its measured retarding effect throughout the remainder of the upward stroke. On the downward stroke there is again the same amount of lost motion until the lower nut 148 is encountered. The remaining downward movement restores the device 146 to its original condition. There is, however, no substantial resistance opposed to downward movement of the piston AP by the device 146.

The piston rod 150 of the piston AP is connected to operate the sleeve 48 up and down through an offset arm 152. The lower end of the arm 152 is formed with a bore which just fits the upper end of the piston rod 150. A screw is threaded through the lower end of the arm 152 into engagement with the base of a circumferential groove in the rod 150 for establishing a driving connection from the rod 150 to the arm 152. The upper offset end of the arm 152 fits into a shouldered recess 154 of the sleeve 48 for driving the sleeve up and down without lost motion.

The motor A not only drives the spindle and saw up and down but it also drives a rack 156 which moves idly in an upward direction but serves to drive the holder 24 a step during each return or downward stroke (see particularly Figures 2, 7, 10, 14 and 22). A piston extension rod 158 fits downward into the bore 160 of the arm 152 and is fixed therein by a tapered cross pin 162. A compression coil spring 164 surrounds the lower end of the extension rod 158 and yieldingly urges the rack 156 upward against a downwardly facing shoulder 174 of the extension rod. The rack 156 is formed with a bore 166 which slidingly receives and fits the smaller diameter portion of the extension rod 158 which is located below the shoulder 174.

Figure 10:
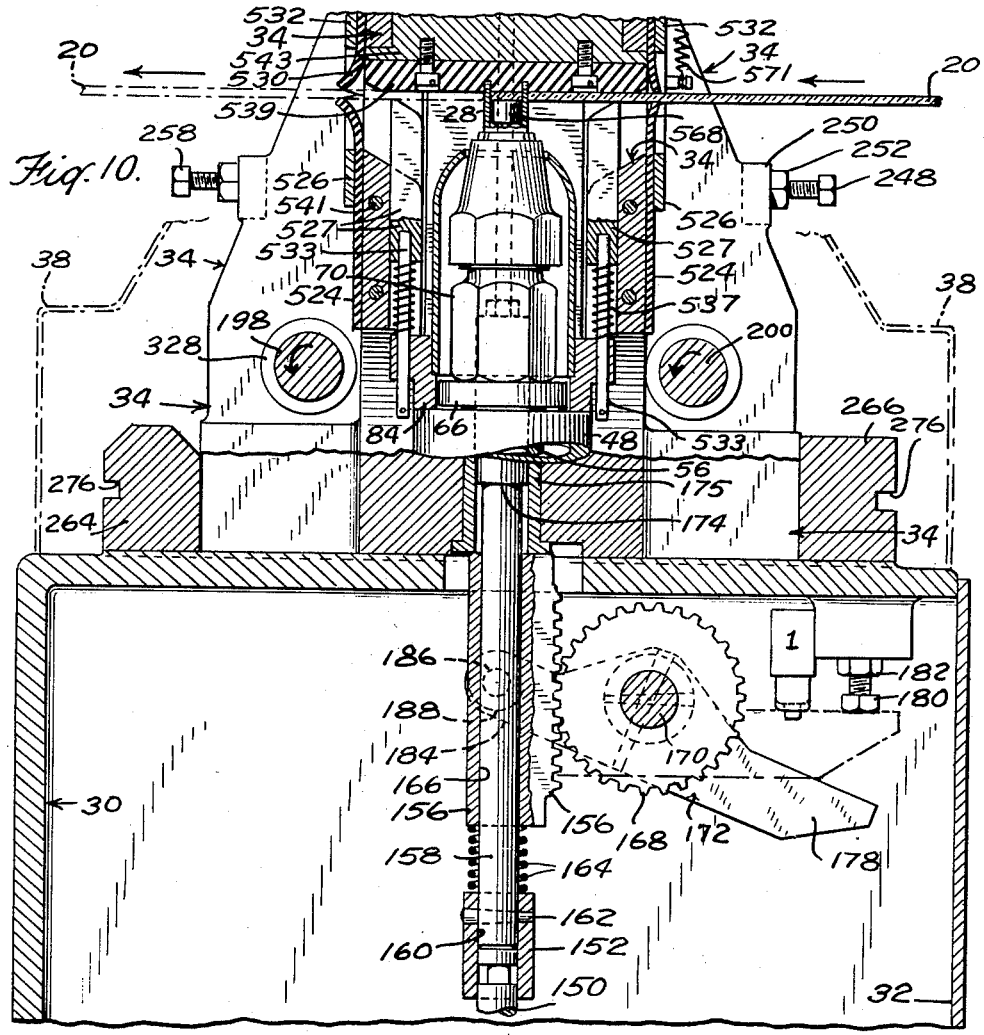
Figure 10 is a fragmentary view in transverse vertical section taken upon the line 10—10 of Figure 2, looking in the direction of the arrows, the view being on a considerably larger scale than Figure 2.

The rack 156 has driving engagement with a gear 168 which is pinioned on a horizontal rock shaft 170. The rock shaft 170 also has pinned upon it a rocking lever 172. The lever, as seen in Figure 10, is rocked clockwise as the rack 156 moves upward. It is not essential that the rack travel upward to the same extent as the piston rod 150. The spring 164 yieldingly supports the rack 156. Upward movement of the rack 156 is limited by a fixed bushing 175 which forms a stop for the rack 156, while the piston rod 150, its extension 158, and the spindle 50 all continue to move upward. On the ensuing downward stroke, however, the shoulder 174 again engages the rack and positively forces the rack to a predetermined lower limit of movement.

The arm 178 of the lever 172 is swung upward as the rack descends, being finally carried into position to engage and close the switch 1 for starting the piston upward again. An adjustable stop screw 180 is located alongside the switch and is locked in adjusted position by a lock nut 182. The stop screw positively limits the upward movement of the arm 178. This is important among other reasons because it protects the switch 1 against damage in the event that the switch 1 fails to perform the intended reversing function, because of some fault in the electric circuit, or because of a failure of current supply. The screw 180 is sturdy enough to arrest the downward movement of the piston AP under the impulsion of the compressed air in the upper end of the cylinder AC.

The opposite end 184 of the lever 172 which moves upward as the rack 156 moves upward is pivotally connected through a pin 186 to the lower end of a pawl arm or pawl carrier 188 of which pawls 190 and 192 (Fig. 13) form integral parts. The pawl carrier 188 moves upward idly, but as it moves downward it advances one of two ratchet wheels 194 and 196 a single tooth space, depending upon whether the pawl carrier is held to the left as seen in Figures 13 and 14 for engaging the ratchet wheel 196 to feed the sheet holder 24 in one direction, or is held to the right for engaging the ratchet wheel 194 to feed the sheet holder 24 in the opposite direction. The ratchet wheels 194 and 196 are mounted, respectively, on feed shafts 198 and 200 which they drive in unison with themselves.

The ratchet wheels shown are adapted only for use in sawing one size of button blank. Other ratchets with other tooth spacings must be substituted each time the saw size is changed. Provision is made for facilitating ratchet wheel substitution and for relatively adjusting the ratchet wheels to cause them to be exactly a half step out of phase with one another, as will be described and explained at a subsequent point.

Figure 18:
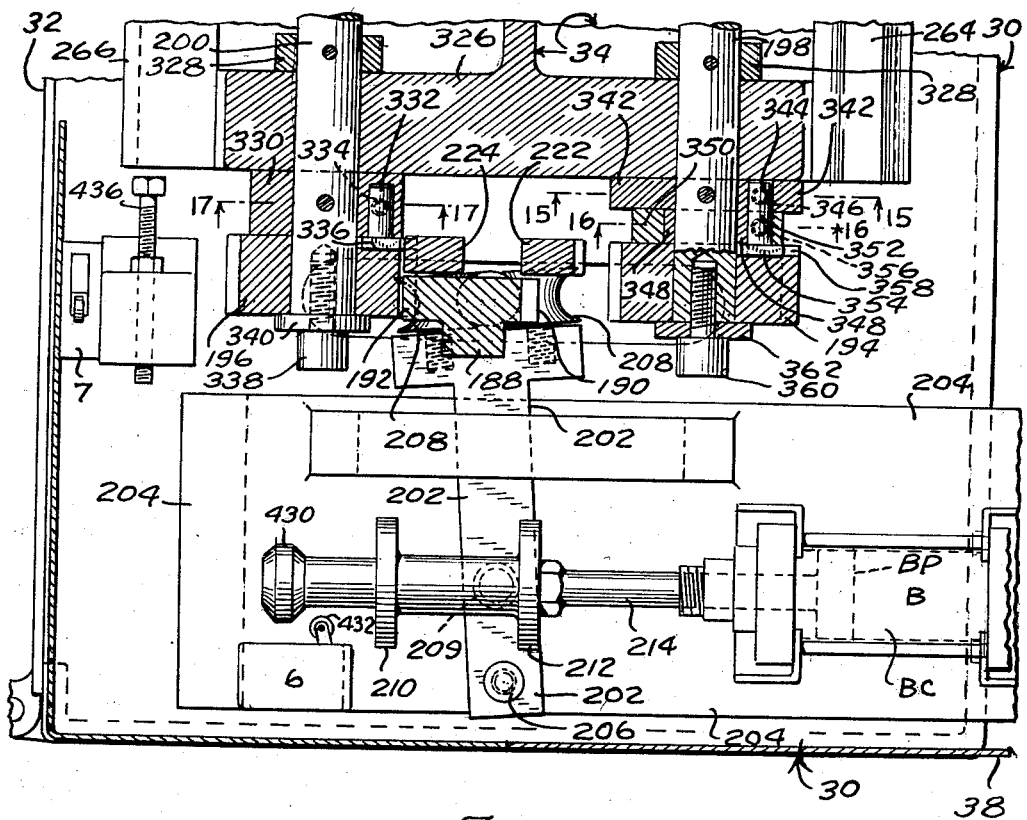
Figure 18 is a horizontal sectional view taken on the line 18—18 of Figure 13, looking in the direction of the arrows.

The right hand or left hand position of the pawl carrier 188 is controlled by a block 202 which is supported for horizontal pivotal movement upon the floor portion of a fixed bracket 204, being secured to said bracket by a headed pivot stud 206. The block 202 embraces the pawl carrier 188, being provided with rollers 208 which engage opposite sides of the pawl carrier. The block 202 carries at its upper side a roller 209 which extends upward between spaced collars or discs 210 and 212 fast upon a piston rod 214 of a pneumatic motor B (Fig. 18).

The motor B is fixedly mounted upon the stationary bracket 204. It comprises a cylinder BC, and a piston BP to which the piston rod 214 is rigidly attached. The motor B is in all respects like the motor A, save that it is horizontally disposed, and that it is not provided with a "Hydrocheck." It is furnished with compressed air from a main supply pipe 216 through a branch pipe 218.

As shown, the piston BP is at its left hand limit of movement as viewed from the rear of the machine so that the pawl carrier 188 is urged by pneumatic pressure toward the ratchet wheel 196. This condition is brought about by engagement of a forwardly projecting switch operating block 220 on the sheet holder 24 with a switch 3, whereby switch 3 is closed. Such closing of the switch 3 occurs after the sheet has been fed toward the left (as viewed from the front of the machine), by the holder 24, far enough to cause the right hand boundary of the sheet 20 to clear the cutting station by a step or two. The closing of the switch 3 causes pawl carrier 188 to be moved away from the sprocket 194 and into operative relation with the sprocket 196, thereby effecting a reversal of feeding so that the holder 24 and the sheet 20 are now fed step by step from left to right as viewed from the front of the machine. When this new movement has been carried far enough to cause the switch operating block 220 to engage the closed switch 4 (a step or two after the left hand boundary of the sheet has moved clear of the cutting station) the connections to cylinder BC are again reversed and the pawl carrier 188 is again carried into association with the ratchet wheel 194 to cause the holder 24 and the sheet 20 to be once more fed from right to left.

It is essential that means be provided for preventing retrograde movement of the active ratchet wheel by the pawl carrier as the pawl carrier moves upward, and also that means be provided to limit the feeding step to exactly a single tooth space. For preventing retrograde movements, locking pawls 222 and 224 are provided for the respective ratchet wheels 194 and 196. The pawls 222 and 224 are mounted for pivotal movement, respectively, upon stationary pivot pins 226 and 228. The pawls 222 and 224 are connected to one another by a link 230 of such length that only one locking pawl at a time may engage its ratchet wheel. The active locking pawl prevents the active ratchet wheel from being frictionally moved backward as the feed pawl carrier 188 moves upward.

On the same pivot pins with the locking pawls 222 and 224, respectively, are arms 232 and 234 which will be referred to as roller arms. A torsion spring 236 which is wrapped around the pivot pin 226 tends to swing the arms 222 and 232 toward coincidence, but such relative movement is limited by an obstructing finger 238 on the arm 232. A torsion spring 240 which is wrapped around the pivot pin 228 tends to swing the arms 224 and 234 toward coincidence, but such movement is limited by an obstructing finger 242 on the arm 234.

As seen in Figure 14 the upper end of the pawl carrier 188 carries rollers 244 and 246 at its opposite sides adapted for engagement respectively with the roller arms 232 and 234. The roller 246 is bearing hard but yieldingly (with pneumatic pressure) to the left against roller arm 234 and presses the roller arm 234 against an adjustable stop screw 248. The screw 248 is threaded through a stationary ear 250 and secured against accidental change of position by a lock nut 252. The position of the roller arm 234 is controlled by the pressure of the roller 246 and the position of the stop screw 248. The torsion spring 240 urges the pawl 224 toward the ratchet wheel 196, but a stationary obstructing pin 254 holds the pawl 224 at a short distance away from engagement with the base of the adjacent ratchet wheel tooth. In this position the pawl 224 opposes a light yielding pressure resisting advance of the ratchet wheel 196, but not until the wheel has been well started in a feeding step. The roller arm 234 substantially controls the upward path of movement of the pawl carrier 188 and absolutely controls the downward movement of the pawl carrier. By proper adjustment of the stop screw 248 assurance can be had that the pawl 192 in its downward movement will escape engagement with the second tooth back, thereby assuring that only a single tooth space advance will be effected. The obstructing pin 254 extends rearward from a guide rib 256 which affords lateral support for the locking pawls 222 and 224.

When the condition of the pawl carrier 188 is reversed, it automatically reverses the condition of the locking pawl and roller arm combination. The roller arm 232 is then pressed by the roller 244 against an adjustable limit screw 258 which is mounted, adjusted and locked in the same way as the screw 248. The locking pawl is also swung across into engagement with a stationary obstructing pin 260 which corresponds in all respects with the obstructing pin 254.

It has been said that the adjustable stop screw 180 which limits upward movement of the arm 178 protects the switch 1 against damage. A more important function performed by the screw is to determine precisely and absolutely the downward limit of feeding movement of the pawl carrier 188. The adjustment of the screw 180 is such that the pawl carrier 188 is moved downward just barely far enough to ensure that the active locking pawl will snap into locking position. It is important that this phase of the operation be carried out with precision so that there will be no possible variation of feeding from step to step.

By the arrangement shown it is assured that the locking pawl associated with the active ratchet wheel will be active and that the locking pawl associated with the inactive ratchet wheel will be held out of engagement with its ratchet wheel altogether. The importance of this will be appreciated when it is noted that each of the ratchet wheel shafts 198 and 200, with which the ratchet wheels 194 and 196 are respectively made fast, is constantly connected through a sprocket with a common sheet holder driving chain. Whenever the ratchet wheel 196 is driven clockwise a tooth space (as viewed in Figure 14) by its feed pawl 192, the ratchet wheel 194 is simultaneously driven a tooth space in the same direction by the shaft 198, and whenever the ratchet wheel 194 is driven counterclockwise a tooth space (as viewed in Figure 14) by its feed pawl 190, the ratchet wheel 196 is simultaneously driven a tooth space in the same direction by the shaft 200.

What has been explained above will be better understood if we turn to the means for supporting, guiding and driving the sheet holder 24.

The sheet holder 24 is mounted upon a carriage 36 and is movable from front to rear and from rear to front by and with the carriage. The carriage 36 is a rigid skeletonized structure which is supported on parallel left and right guide rails 264 and 266 for fore and aft sliding movements. The rails 264 and 266 rest upon the top of the base at opposite sides of the head and are secured to a relatively broad, lower portion of the head by countersunk headed screws 268. The rails both extend forward beyond the base for a substantial distance. The rail 266 is flat on top while the rail 264 forms a blunt inverted V. The carriage includes formations complementary in shape to the rails 266 and 264 for sliding on the rails. The rail 264 and the carriage portion complementary thereto prevent the carriage from shifting sidewise relative to the rails, so that the carriage is compelled to move fore and aft in a prescribed straight path. Hold-down and guide plates 270, affixed to the carriage by screws 272, have inturned flanges 274 which travel in channels 276 formed in the outer side faces of the rails 264 and 266.

The structure of the carriage 36 may be best understood by reference to Figures 1 and 19. The carriage includes a right hand section which consists of front and rear side arms 278 and 280 of angle construction, each comprising horizontal and vertical webs. These members are joined to one another by a fore and aft member 282 which includes upper and lower horizontal webs and a connecting vertical web, and which rides on the right hand rail 266. A left hand carriage section is a mirror image of the right hand section and corresponding reference characters have been applied to corresponding parts. The member 282 of the left hand section rides on the left hand rail 264. The members 282 are united by a vertical transverse web 284 at the extreme forward end of the carriage and also by a horizontal web 286. Between the members 282 there is a large rectangular opening or slot which extends into the carriage from the rear almost to the front arms 278. The carriage cover or table 22 is composed of two flat sheets which are secured on the right and left hand carriage sections. The table sheets are spaced apart in the middle almost as widely as the members 282. The sheets are formed with downturned lips 288 for lifting a possibly sagging leading edge portion of the plastic sheet 20 to the general horizontal level of the table top. The cutout or slot is provided in the table so that the table may be fed into embracing relation with the upper part of the head 34, thus enabling the portion of the sheet adjacent the front table arms 278 to be fed rearward to the cutting station.

The ratchet shafts 198 and 200 extend forward beyond the forward limit of the forward boundary of the carriage. Each shaft is provided with a key 289. Sprockets 290 and 292 are keyed on the shafts 198 and 200, respectively. The sprockets are duplicates of one another, so that a description of one will suffice for both. Each sprocket is controlled in its position lengthwise of the associated shaft by the carriage. The sprocket 292 on the shaft 200 is formed with a shouldered hub 294 (Fig. 21), the reduced portion of which fits through a downwardly opening vertical slot 295 formed in the transverse member 284 of the carriage. The shouldered portion of the hub 294 bears forwardly against the rear face of the member 284. A collar 296 is made fast on the reduced portion of the hub 294 to bear against the forward face of the member 284. While the sprocket and hub are free to turn with the shaft 200 they are compelled to move lengthwise of the shaft in unison with the carriage. The sprocket 290 is not only of similar construction but it is similarly mounted and controlled in its movements. A roller chain 297 is trained on both the sprockets 290 and 292 and is depressed between the sprockets by a guide sprocket 298, the pinion being supported by a bearing pin 300 which is mounted on the carriage member 284. The chain 297 constitutes the driver for the sheet holder 24.

The holder 24 comprises a lower block or row 301 upon which the switch operating projection 220 is carried, and an upper block or row 303 which is separably secured thereto by screws 302. These blocks are desirably about twelve inches long. They jointly form a recess at their rear margins which is approximately 1/16" wide and 1/16" deep. An angle guiding member or track 304 is rigidly secured to the front face of the carriage member 278 and, jointly with said members, forms a guide channel for the holder 24. It also supports the holder 24 and the chain 297 for sliding movement. A bar 306 is fitted into the forward lower corner of the guide channel, being secured to the member 304 by fillister headed screws 308 which pass with substantial clearance through the bar. The block 301 is rabbeted to fit the bar 306. When the vertical faces of the bar 306 and/or the block 301 become worn by rubbing against one another and/or against 278 or 304 the holder clamp may tend to twist. It is for this reason that the bar 306 is provided. The bar may be removed from the channel and re-applied with shims interposed between the vertical faces of the bar 306 and carriage member 278.

The chain 297 is connected to one end of the block 301 and is trained around an end sprocket 308, the sprocket being rotatively mounted in a bracket 310 which is fixed on the extreme left end of the front left carriage member 278 (shown at the right in Figure 19 because the mechanism is viewed from the rear in that figure). The chain is then led through an opening in a first carriage member 282, over sprocket 290, under guide sprocket 298, over sprocket 292 and through the second carriage member 282. The chain is then led around a second end sprocket 312 and has its second end secured to the right end of the block 301 (seen at the left in Figure 19). The sprocket 312 is rotatively mounted in a bearing bracket 314 which is adjustably mounted on the right end of the right front carriage member 278 for chain-tightening purposes. The bracket 314 is formed with a horizontal slot 316. Headed screws 318 have their shanks passed forward through the slot and threaded into the adjacent carriage member 278 far enough to clamp the bracket securely in adjusted position. A headed screw 320 is threaded through the bracket to bear against an end of the member 278. The screw is first adjusted to adjust the bracket. The screw is then locked by a lock nut 322, and it is only then that the screws 318 are tightened to clamping positions.

The switch 3 which reverses the motor B at the left hand limit of holder movement and thereby reverses the direction of movement of the holder 24 from left to right is mounted on an angle bracket 324 which is secured on the forward face of the left end of the continuous angle member 304. The switch 4 which reverses the motor B at the right hand limit of movement of holder 24 and thereby reverses the direction of movement of the holder from right to left, is mounted on a similar angle bracket which is secured on the forward face of the right end of the continuous angle member 304.

In order to start a new row when an old one is finished, it is necessary not only to reverse the direction of holder feed but also to feed the carriage one step to the rear.

As has been pointed out, the second row cuttings are a half step out of line with the first row cuttings. This means ratchet wheels 194 and 196 must be a half step out of phase with one another. In other words, when the pawl 192 has fed the ratchet wheel 196 a tooth space, as shown in Figure 14, the ratchet wheel 194 must be just a half tooth space away from a position which it would occupy at the conclusion of a feeding step imparted by the pawl 190 to the ratchet wheel 194. Since this condition must hold true for ratchet wheels of various sizes and of various tooth spaces, it is evident that a micrometric adjustment of one of the ratchet wheels relative to its shaft must be available. When changing the saw size it is necessary also to change ratchet wheels, to re-adjust stop screws 248 and 258, and to adjust the relative phase of the ratchet wheels.

The details of ratchet wheel substitution and phase adjustment are best illustrated in Figures 13, 14 and 18. The shafts 198 and 200 are rotatively supported at their rear ends in a vertical plate 326 of the head 34. Collars 328 are pinned to the shafts at the front of plate 326 to prevent rearward axial movement of the shafts 198 and 200.

To the rear of the plate 326 the shaft 200 has pinned to it a disc 330 which bears against the rear of the plate to prevent forward movement of the shaft. The disc 330 is formed with a bore parallel to its axis, in which the cylindrical stem portion of a rectangular driving block 332 is fitted. A set screw 334, threaded into the disc 330, bears against the block stem to fix the block in a radially extending position. The block, proper, is disposed to the rear of the disc 330. The ratchet wheel 196 has formed in it a radial channel 336 into which the block fits. The channel and block fix the ratchet wheel 196 in a predetermined angular relation to the shaft 200. When the ratchet wheel 196 has been placed on the shaft 200 with the channel 336 receiving the body of the block 332, a headed retaining screw 338 first has its shank passed through a washer 340 and then threaded into the rear end of the shaft 200 to fix the ratchet wheel 196 securely but removably in place.

Means for effecting micrometric angular adjustment is provided in connection with the shaft 198 and the ratchet wheel 194. A disc 342 is pinned to the shaft 198 to bear against the rear face of the plate 326. The disc 342 (see Figure 15), which may be cut away at opposite sides to provide flat parallel faces, is formed with an arcuate slot 344. Headed adjusting screws 346 are threaded into the disc from opposite sides and extend into the slot 344 from opposite ends. The disc 342 includes a rearwardly extending hub portion 348 upon which a second disc 350 (see Figure 16) may be rotatively fitted.

The disc 350 is provided with a bore which extends parallel to the axis of the disc. The stem portion 352 of a feed block 354 is passed forward through the bore of the disc 350, and is fixed in place by two set screws 356 to fix the block 354 in a radial position and to attach the block to the disc. The disc 350 and the block 354 desirably form a permanent assembly.

The ratchet wheel 194 is formed with a radial slot 358 in which the drive block 354 fits. When placing a fresh ratchet wheel 194 in the machine the screws 346 are first backed off slightly, the unit consisting of disc 350 and the drive block 354 is then placed on the hub 348 of the disc 342. The stem of the block is inserted between the screws 346 and the screws are adjusted to align reference marks on the discs 342 and 350, the screws then being tightened firmly to retain the adjustment. The ratchet wheel 194 is then placed on the shaft 198, oriented to receive the block 354 in its slot 358. A headed screw 360 then has its shank passed through a washer 362 and threaded into the rear end of the shaft 198 to hold the parts securely in place. By providing the disc 350 as a permanent holder for the block 354 the radial disposition of the block 354 can be permanently maintained and the stem of the block can be as steadily and rigidly supported during adjustment of the screws 346 as if it were an integral part of the disc 350.

Figure 11:
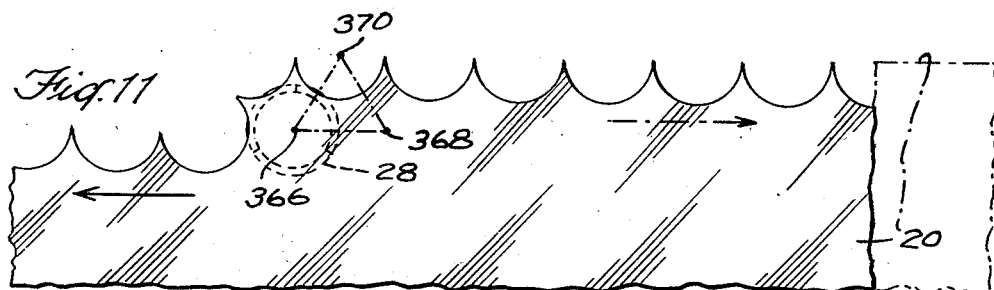
Figure 11 is a fragmentary plan view of a sheet which has been scalloped along its starting edge and from which a partial row of complete blanks has been cut.
Figure 12:
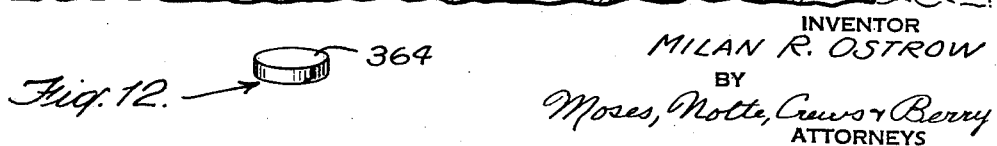
Figure 12 is a perspective view of one of the button blanks as cut by the machine.

In Figure 11 a fragment of a sheet 20 of plastic material is shown at the stage when a first complete row of half blanks has been cut from right to left and a second row of full blanks 364 has been partially cut from left to right. The figure also indicates two successive cutting centers 366 and 368 of the second row and the intermediate cutting center 370 of the first row, with the lines of centers drawn in. The lines of center form an equilateral triangle. This relationship of centers is maintained throughout the cutting of the entire sheet. The outline of the saw 28 is indicated in dotted lines showing that the inner circumference of the saw is not quite tangent to the previously made cuts but that the outside circumference of the saw overlaps all adjacent arcs of cutting.

It is important that the outside diameter be at least tangent to the adjacent arcs of cutting so that no skeletonized sheet materail will be left intact. It is also important, however, for the inner diameter of the saw not to overlap the previous arcs of cutting, because then imperfect blanks would be produced. From the foregoing considerations, it is evident that the feeding step within a row must be not less than the sum of the internal and external effective cutting radii of the saw and not more than the external diameter of the saw. The former spacing is the most economical of material while the latter is the most wasteful. Since it is important not to go outside either of the limits referred to above a compromise is desirably chosen between the limits named.

By reference to Figure 11 it will be apparent the length of each feeding step in a row is equal to the line of centers 366—368. It is also evident that if a true equilateral triangular relationship of centers is to be maintained the feeding step from row to row must be equal to the product of the line of centers by the sine of sixty degrees. It is not essential that the relationship be precise but it is essential that all cutting paths of the saw at least touch and preferably partially overlap. Transverse feeding means for the carriage is accordingly provided for each different saw size which will effect transverse feeding steps substantially equal to the product of the length of a line of centers by $$\frac{\sqrt{3}}{2} \text{ or } .87$$

The mechanism for effecting step by step cross feeding of the carriage from front to rear of the machine comprises a rack bar 372 which is rigidly secured at its rear end to the front carriage member 284 by means of a screw 374. The rack bar illustrated is adapted for only one size of button blank. It is replaceable by other rack bars having other tooth spacing when other sizes of button blanks are to be sawed. The rack is formed with rectangular teeth and with rectangular notches between the teeth.

A housing member 376 (Figures 2A and 19) has a rear thick channel portion 378 secured between the guide rails 264 and 266. The member 376 includes rear and side vertical walls and a horizontal top wall. It serves to support and house mechanism for controlling and actuating the carriage 36 through the rack 372. The rack 372 extends forward from the carriage through an opening 380 formed in the rear vertical wall of the member 376, being supported and guided in the lower portion of said opening. A stationary bar 377 is secured at its rear end to the lower side of the cross portion 378 of the housing member 376 by screws 379.

The bar 377 has an upturned forward end portion 382 through which an adjustable abutment screw 384 is threaded. The rear end of the screw 384 abuts against the front face of a block 386 which is mounted on the bar 377. The block 386 is adjustably clamped to the bar 377 by headed screws 388 whose shanks are passed upward through a slot 390 of the block and threaded into the block. A different adjustment of the block 386 is required for each different rack which is employed. When the block 386 has been micrometrically adjusted to the correct position by the use of the screw 384, the screws 388 are tightened to clamp the block fixedly in place. The block 386 has rigidly secured to it a rearwardly extending stop pin 392 for a purpose which will presently be made manifest. The block also pivotally supports a holding pawl 394 which is normally engaged with the front face of a rack tooth to prevent forward movement of the rack and carriage. The pawl 394 is provided with a laterally projecting lifting handle 396 which may be manually lifted to hold the pawl disengaged during manual return of the carriage in a forward direction to the starting position. Mere disengagement of the pawl 394 does not, of itself, completely free the carriage for manual movement.

The rack feeding mechanism is controlled and operated by a pneumatic motor C which is carried by and substantially within the housing member 376, being supported from the member 376 by brackets 398. The motor C comprises a cylinder CC, a valve CV and a piston (not shown) which is located within the cylinder CC. The motor C is like the motor A with the exception that it is horizontally mounted and that it is not equipped with a "Hydrocheck." The motor C is furnished with compressed air through a branch 400 of main air pipe 216. The piston (not shown) is rigidly connected to a rearwardly extending piston rod 402. The rod 402 has a shouldered enlarged extension 404 which passes rearward through a feed pawl 406 and feed pawl carrier 408. The feed pawl 406 (which is also a locking pawl) comprises a rack engaging finger 410 and two vertically extending side plates 412 to which the finger is rigidly attached by two screws 414. The side plates 412 are formed with inclined slots 416 through which the opposite ends of a cross pin 418 extend. The cross pin extends horizontally through a bore formed in the piston rod extension member 404, and always moves in unison with the member 404. The pawl carrier 408 slidingly fits upon the rod member 404. It is formed with a horizontal slot 420 through which the pin 418 extends. The carrier 408 is formed in its lower portion with a vertical slot, in which the finger 410 is slidingly disposed. The carrier 408 secures the pawl against fore and aft rocking movement, guiding it for right line, vertical movement. The side plates 412 extend downward alongside the rack. Filler blocks or shoes 422, secured to the side plates 412 at the inner sides of the lower ends of the side plates, engage opposite sides of the rack 372 for holding the pawl and pawl carrier steady and for preventing rotation of the piston rod 402.

The piston rod extension member 404 is formed with a shoulder 424 against which the pawl carrier 408 is normally held by a spring 426. The spring 426 bears at one end against the pawl carrier 408 and at the opposite end against a collar 428 which is fast on the member 404. As the parts are seen in Figures 2A, 3 and 6, the piston rod member 404 is at its advance (rearward) limit of movement. The pawl carrier is pressed against the shoulder 424 under normal pressure by the spring 426. This is the condition which prevails throughout the cutting of a row of button blanks.

Referring for a moment to Figure 18, it will be remembered that at the end of a row the piston rod 214 of motor B is actuated in one direction or the other according to whether switch 3 or switch 4 is closed, in order to reverse the feeding of the sheet holder 24. The piston rod 214 has formed upon its end a cam enlargement 430 which engages and depresses the actuating roller 432 of switch 6 each time the cam 430 is moved in either direction. The switch 6 is thus closed normally as an incident of the reversal of the holder feed at the end of each row.

The closing of the switch 6 reverses the condition of the motor C, causing compressed air to be delivered to the rear end of the cylinder C. This causes the piston rod member 404 to be pulled toward the front end of the machine. Because the rack 372 is held against movement by the stop pawl 394, and because the pawl finger 410 is engaged with the rack, the pawl and pawl carrier cannot move with the member 404. The shoulder 424 pulls away from the pawl carrier 408. Since the collar 428 moves in unison with the piston rod member 404, the spring 426 is further compressed. The cross pin 418 also travels with the member 404, moving along the horizontal slots 420 of the pawl carrier 408 and along the inclined slots 416 of the side plates 412. This cams the side plates upward, causing the pawl finger to be pulled upward clear of the rack. As soon as this occurs the pawl and pawl carrier are free to move and they do move under the force of the spring 426 in the same direction in which the member 404 is travelling. In this movement the inclined slots gain upon the cross pin, tending to force it down again, but so long as the finger 410 is on top of a tooth this cannot be done. When the pawl finger has been carried into line with the next notch of the rack it is snapped partly down into the notch by the locking spring 426. At about the same time the pawl 406 engages the actuator of a switch 5 which is carried on a bracket 432 attached to the stationary block 386, and immediately thereafter the pawl carrier is arrested in its movement by engagement with the stop finger 392 on the block 386.

The closing of the switch 5 again reverses the motor C, causing compressed air to be admitted to the rear end of the cylinder CC and the piston rod to be thrust in cross-feeding direction toward the rear of the machine. The first consequence of this reversal is to move the cross pin 418 to the extreme rear ends of the slots 416 and 420 so that the pawl finger is forced fully down into the fresh notch of the rack which it has engaged. From that point on the rack is moved a tooth space in unison with the piston rod. It will be observed that in the operation described the piston of motor C started from its rear limit of movement, pulled the pawl finger 410 forward one tooth space relative to the rack, and then returned to its initial position, causing the pawl finger also to be returned to its initial position. The rack is, therefore, fed exactly one tooth space at each feeding operation. This result is secured because the retraction of the pawl was limited to one tooth space. That limitation was imposed by the adjustment of the block 386.

The step by step feeding of the rack to the rear is continued after the completion of every row and as an incident of the reversal of holder feeding until the entire sheet has been used up as nearly as possible. When the last available row of blanks has been cut, a further reversal of holder feed occurs and in consequence a further cross-feed is undertaken. As the cross-feed is being executed, however, a finger 434 which is adjustably mounted on the carriage, and which extends rearwardly from the carriage, engages the actuator of normally closed switch 7 to open the switch. Shortly thereafter the carriage comes into contact with an adjustable screw 436 and is arrested by it. The switch 7 is connected in series with the switch 1 through which upward movement of the piston AC of the motor A is brought about. The piston AC, therefore, comes to rest at the conclusion of its next down stroke. This interrupts the reciprocation of the spindle with the saw fully retracted. It also interrupts the holder feed. The machine, therefore, remains at rest so far as the cyclically operating parts are concerned until the operator has given it due attention. Just what that consists of will be better understood after the circuits of Figures 22 and 23 have been described.

All electrical power employed in the machine is furnished from a conventional 110-volt 60-cycle A. C. power line consisting of conductors 440 and 442. It is fed into the machine through switch 8 which may be regarded as a master switch. It is separately fed, through a switch and connections not shown to the motor of a suction-blower fan which will be hereinafter described. When the switch 8 is closed current is delivered to the primary winding of step-down transformer 444, through conductors 446 and 448. It is also delivered through branch conductors 450 and 452 to the spindle driving motor M which is connected in parallel with the transformer.

The secondary of the transformer 444 is connected to ground at 454. The transformer output is delivered through a conductor 456 to a junction 458. From junction 458 the circuit of switches 1 and 7 is continued through a conductor 460, junction 462, and conductor 464 to terminal 466 of switch 10. The switch 10 is the familiar three-way toggle switch commonly used in house lighting circuits. The movable contact member 468 has two positions, namely, the full line position of Figure 23, in which it connects the terminal 466 with a terminal 470, and the dotted line position of Figure 23, in which it connects the terminal 466 with a terminal 472. In order for current to reach the switch 1 the member 468 must occupy the full line position of Figure 23. The circuit being traced then continues from 466 through 468 to terminal 470. From 470 the circuit continues through conductor 474, switch 9 (when closed) and conductor 476 to normally closed switch 7. From switch 7 the circuit is continued through conductor 478 to switch 1. When switch 1 is closed by the arm 178 at the conclusion of the down stroke of piston AP, current is delivered through conductor 480 to the winding of solenoid S1 which forms part of motor A and continues thence to ground through conductor 482. This brings about upward movement of piston AP as has been explained.

When the piston AP has been moved to its upper limit it acts through the upper end of the arm 152 to close switch 2 automatically. Current from the transformer now flows through conductors 456 and 460 to switch 2. From switch 2 the current continues through conductor 484 to the winding of solenoid S2, and it passes thence to ground through conductor 486. This brings about downward movement of piston AP as has been explained.

When the switch 3 is closed to change the direction of holder feed from right-to-left to left-to-right, current flows from the transformer through conductors 456 and 460 to junction 488. From junction 488 the current is delivered through a conductor 490 to a junction 492. From 492 the current travels along conductor 494 to switch 3, whence it continues along a conductor 496 to the winding of solenoid S3 which forms part of motor B. From solenoid S3 the circuit to ground is completed through conductors 498 and 500. This sets the longitudinal feeding mechanism for left-to-right feed.

When the switch 4 is closed to change the direction of holder feed from left-to-right to right-to-left the circuit from the transformer to junction 492 is the same as for switch 3. The current flows thence along a conductor 502 to switch 4. From switch 4 the current is delivered by a conductor 504 to the winding of solenoid S4, whence it passes to ground through conductors 506 and 500.

When the switch 6 is closed by the cam 430 to initiate a cross-feed step as an incident of the reversal of the holder feed, current may flow from the transformer through conductor 456 to terminal 458 and thence through conductor 508 to the switch 6. From the switch 6 the current continues along conductor 510 to terminal 472 of switch 10. Although the member 468 is at this time in its upper position, the circuit is continued from terminal 472 through a conductor 512 to the winding of solenoid S6 which forms part of the motor C, and passes thence to ground through conductors 514 and 516. This produces unlocking and retraction of the feed pawl.

When the switch 5 is closed as an incident of the retraction of the feed pawl by motor C, the circuit may be traced from the transformer through conductors 456, 460 and 464 to terminal 466 of switch 10. With the member 468 in the full line position the circuit will be continued from the terminal 470 through conductor 518 to switch 5. From switch 5 the current flows through a conductor 520 to the winding of solenoid S5 of motor C, whence it passes through conductors 522 and 516 to ground. This re-locks and reverses the direction of movement, to advance the rack a step (rearward).

When the carriage is finally moved rearward by motor C into position to engage and open normally closed switch 7, the switch 1 is open-circuited. When the piston AP next reaches its downward limit of movement, carrying the arm 178 into position to close switch 1, the circuit remains dead and the pneumatic motor A remains at rest. The automatic major cycle is thereby terminated. This will occur with the motor C seeking to drive the obstructed table to the rear. Although the automatic cycle is finished, the motor C is not de-energized, and still urges the table toward the rear. Normally the switch 5 is opened by the first portion of the feeding movement of the table. In this particular instance, however, it is possible that the last full step of transverse feeding has left so little space available for further movement of the carriage that the arrest of the final partial step occurs with the switch 5 still closed. In order that the table may be manually returned toward the front of the machine it is necessary (1) that the solenoid S5, if still energized, be de-energized, (2) that the solenoid S6 be energized to reverse the motor C and thereby raise the feed pawl 406 out of engagement with the rack 372, (3) that the switch 5 be disabled so that retraction of the feed pawl will not result in automatic reversal of the motor C and a resumption of the attempted feeding of the carriage, and (4) that the holding pawl be lifted out of engagement with the rack 372 by the lifting handle 396.

Figure 23:
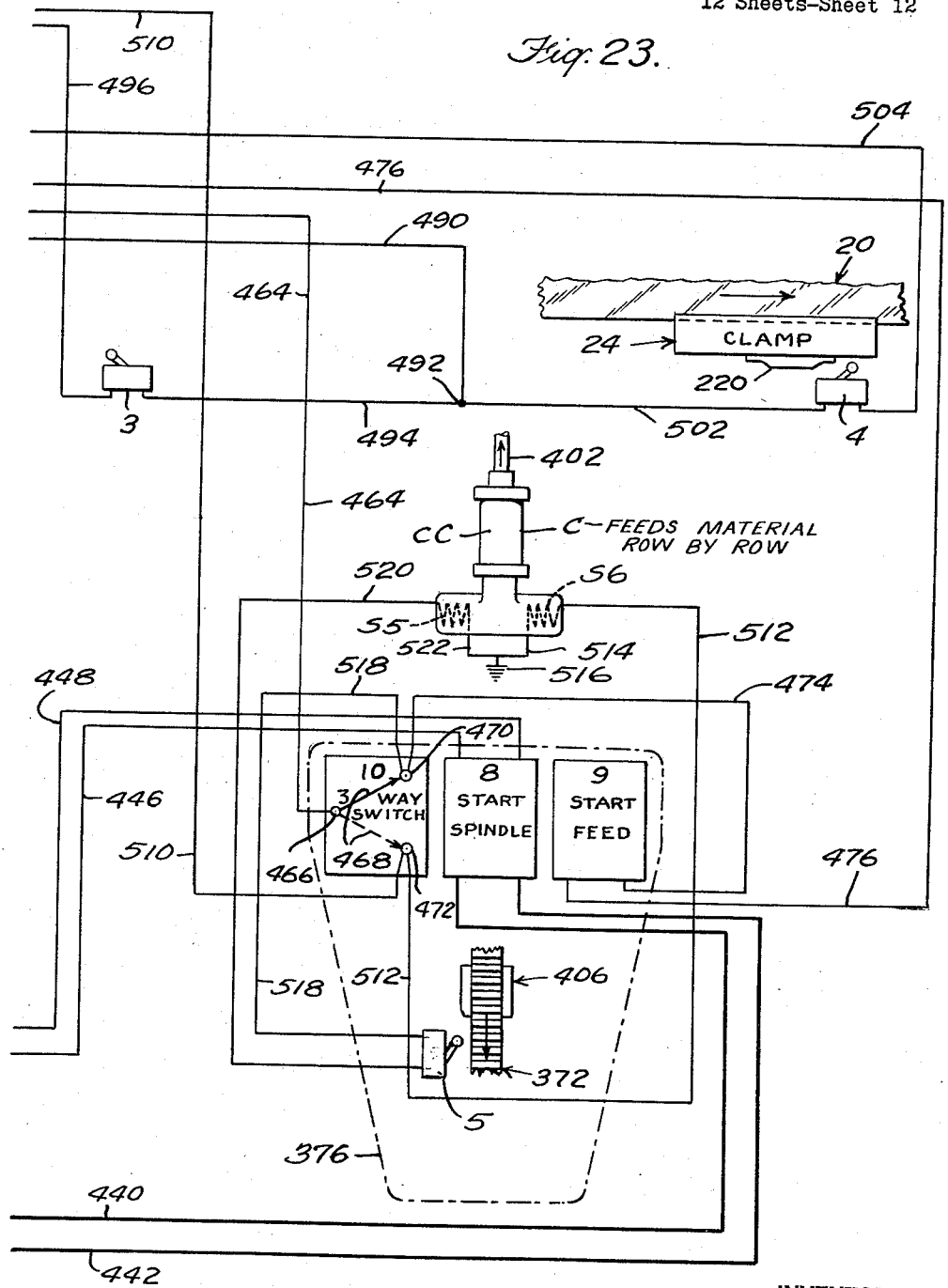

The first three of the requirements mentioned above are achieved by the simple act of operating the switch 10 to transfer the movable contact member 468 from the full line to the dotted line position of Figure 23. If switch 5 was left closed, this renders the switch completely ineffective, making it inoperative until the original condition of switch 10 is restored. It also establishes and maintains a circuit through the winding of solenoid S6 independently of switch 6. This circuit may be traced from the transformer through the conductors 456 and 464 to the terminal 466 of switch 10. The circuit is continued from terminal 472 through conductor 512 to solenoid S6, whence it continues to ground through conductors 514 and 516. With this arrangement the feed pawl is lifted out of engagement with the rack 372 and is moved toward the front of the machine until it is arrested by the finger 392 of the block 386. Although the switch 5 becomes closed as an incident of this movement it completes no circuit, and the pawl 406 continues to be pressed by the pneumatic force of the motor C against the finger 392 in a position completely clear of the rack. Now the operator may with one hand lift the handle 396 of pawl 394 to disable the pawl, and with the other seize handle 524a of the carriage and draw the carriage freely toward the front of the machine, and into engagement with an adjustable stop screw 525.

As described above it was necessary to swing the member 468 of switch 10 to the dotted line position of Figure 23 and to keep it in that position in order to enable the carriage to be moved by hand. This operation of the switch 10 had the concomitant effect of disabling the switch 1 and thereby disabling the pneumatic motor A which effects the holder feeding and thereby directly or indirectly controls every step of the automatic cycle. It is not, therefore, possible to move the carriage manually until the automatic feeding of the work has been arrested, and the vertical reciprocation of the saw has been arrested. Conversely, it is not possible to resume automatic feeding of the work until the movable member of the switch 10 has been restored to its full line position. Switch restoration will find the switch 5 in a closed condition, and the pawl 406 ready to be automatically engaged with the rack and to effect a feeding step. It will be apparent from this that there is a complete and automatic interlock between the automatic work feeding means and the manual feeding of the carriage. This constitutes an important safeguard against accident.

It is an important point that the work sheet is securely clamped against movement from a time just before the saw engages the sheet 20 until shortly after the sawing operation has been completed and the saw has been moved clear of the sheet, but is left free for unimpeded feeding between sawing operations. The mechanism for accomplishing this result is best shown in Figs. 8, 9 and 10. Vertical plate member 525 which form integral parts of the head 34 are formed with rabbets at their forward edges in which clamping fingers 527 are slidingly received. Rabbeted posts 529 complementary to the members 525 are secured to the members 525 by headed screws 531 and serve with the members 525 to define vertical guideways for the fingers 527. The fingers 527 are secured upon the upper ends of rods 533. The rods 533 are passed downward through ears 535 of the bracket 84 and are cottered at their lower ends. Compression coil springs 537 surround the rods 533 and yieldingly support the fingers 527 from ears 535. The bracket 84 is affixed to the sleeve 48 and moves up and down in unison with the sleeve. The fingers 527 normally have their upper ends disposed a little above the cutting edge of the saw 28. As the sleeve 48 moves upward the fingers 527 first engage the work sheet 20 and clamp it at two points against a backstop block 539 which is removably secured by screws 541 above the work sheet to a stationary block 543. The fingers 525 are arrested by the sheet 20 but the saw continues upward, cuts through the sheet 20 and enters the block 539. The block 539 is of sufficiently soft material to permit the saw, when the block is new, to penetrate the block and form its own backpeg in the block. The block 539 has its lower, plane face disposed in the normal feed plane of the upper face of the sheet 20. The block is of sufficient area to stand directly opposite the fingers 527 as well as the saw 28. As the saw is being retracted through the position occupied by it when the fingers 527 first gripped the work, the fingers are withdrawn from engagement with the work, leaving it free for unimpeded feeding movement.

Chips, shavings and dust are formed in very considerable quantities in the cutting of the blanks. It is essential that provision be made for confining and removing the chips, shavings and dust while avoiding the carrying away of the button blanks with them.

To this end it is a feature that the forward part of the head 34 is constructed to provide a vertically extending chamber which is substantially rectangular in cross-section. The front and side walls of the chamber are cut away to provide an opening at the cutting station.

Below the cutting plane a sheet of rubber 524, wrapped around the sides and front of the head just behind and below the opening, covers the opening up to the level of the work sheet. It is secured to the sides of the head by angular clamping plates 526 and clamping screws 528 which have their shanks passed through the plates and threaded into the side walls of the head. Above the cutting plane a sheet of rubber 530 is wrapped around the front and sides of the head above and to the rear of the opening and is clamped to the sides of the head by angular clamping plates 532 and clamping screws 534, which screws have their shanks passed through the plates and threaded into the sides of the head. The upper rubber sheet 530 extends farther forward than the lower rubber sheet 524 because there is a forward projection on the block 543 above the plane of the work. Both rubber sheets extend into rubbing engagement with the work sheet all around so that the cutting station is well sealed against the escape of dust. Beneath the upper projection and within the upper rubber sheet 530, a tubular piece 536a of rubber is provided for bearing against the upper surface of the sheet 20.

Within the duct referred to a sloping plate 536, which extends the full width of the duct, is provided to divide the lower part of the duct into front and rear sections. The plate reduces the active cross-section of the duct, increasing the draft through it. It also assists in directing the cut button blanks into a delivery chute 538 which is affixed to the front of the base 30.

Upon the upper end of the head there is secured a fan casing 540 which comprises upper and lower complementary sections 542 and 544. The lower section 544 includes a circular neck portion 546 which encircles flanges 548 and which rests upon, and is secured to, the side walls of the head (see Figure 1) by screws 550. A conventional fan adapted for peripheral discharge (not shown), is housed within the casing 540 and is driven by a motor 552. The casing includes a discharge mechanism 554 upon which a flexible, porous collecting bag 556 is fitted, being secured thereon by the familiar bayonet slot type of connection 558. The fan exerts a powerful suction through the cutting station and the conduit, capable of picking up shavings, dust, chips and even the button blanks themselves. The air and entrained material sucked up from the cutting station are discharged under pressure into the bag 556.

Provision is made for ejecting the button blanks from the saw at the conclusion of a down stroke and for preventing the button blank or blanks from going up the conduit to the fan and bag at that time.

It will be remembered (see Figure 22) that a compressed air pipe 106 is connected to the lower end of the hollow spindle 50. The air pipe 110 which connects with the cylinder AC delivers also into a branch pipe 558 which goes to a valve 560. The valve closing member 562 is carried by a pivoted lever 564 which is normally held up by a spring (not shown) in valve closing position. As the piston rod of piston AP nears the lower limit of its movement, a rigid arm 565 carried by it engages a roller 566 on the lever 564 and depresses the lever to open the valve. Compressed air then flows through pipe 106 into the hollow spindle 50. A plunger 567 has a head 569 which normally bears against the upper end of the hollow spindle. The plunger also has an upper head 568 which normally lies a short distance below the cutting edge of the saw 28. When the blast of air comes through, the plunger 567 is thrust sharply forward to hurl the button blank or button blanks within the saw completely clear of the saw. As soon as the saw moves upward a short distance, the valve member 562 is closed and the compressed air supply to the spindle 50 is cut off. The surplus air that does not escape through the top of the spindle is bled out of the spindle through the vent 108.

In order to prevent the possible sucking off of the ejected button blank, a perforated hinged plate 570 in the nature of a damper is provided. The plate 570 is fast on a hinge pin 572 and is spring-urged to a rest position, as shown in full lines in Figure 7, to stand completely across the duct and prevent the upward passage of a button blank. The perforations in the damper are small enough to prevent the passage of the smallest button blank. They are provided in order to prevent the locking of the plate 570 in the obstructing position by suction, and in order to avoid too violent and sudden changes in the air flow. The plate 570 occupies the full obstructing position when the cutter is in the lower range of its movement, and hence at the time when the button blank is ejected. This physically prevents the carrying upward of the button blank. It also reduces the draft at the cutting station, helping to induce the blank to drop by gravity into the chute.

As the cutter approaches the cutting position, however, an extension rod 574 on the rod 158 (Figure 7) engages the tail of the plate 570 and thrusts it upward, thereby tilting the plate 570 counterclockwise to the non-obstructing dotted line position 570a. In this position a restricted portion of the conduit is left completely open. The opening starts before the cutting begins and is widest when the saw reaches the upper limit of its movement. As the saw recedes the damper is gradually closed by a tension coil spring 571 which is attached to a crank arm on the pivot pin 572, on which the damper is made fast (Figure 2).

I have described what I believe to be the best embodiment of my invention. I do not wish, however, to be confined to the embodiment shown, but what I desire to cover by Letters Patent is set forth in the appended claims.

I claim:

1. A machine for automatically sewing button blanks from sheet material, comprising, in combination, a tubular saw, a sheet material holder, means for feeding the sheet material holder step by step to advance the sheet material along a prescribed path, means for yieldingly advancing and retracting the saw in alternation between predetermined limits to execute a series of blank cutting cycles, and means responsive to the saw advancing and retracting means during the retracting phase of each cycle to feed the holder a single step.

2. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, and means responsive to the advancing and retracting means during the retracting phase of each cycle to feed the holder a single step, the material feeding means comprising first and second ratchet wheels connected to drive the holder in opposite directions, a pawl carrier reciprocable by the saw advancing and retracting means to execute an idle stroke as the saw is advanced and an active or feeding stroke as the saw is retracted, said pawl carrier including alternatively active first and second feed pawls, the first engageable with the first ratchet wheel to feed the holder step by step in one direction and the second engageable with the second ratchet wheel to feed the holder step by step in the opposite direction.

3. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, and means responsive to the advancing and retracting means during the retracting phase of each cycle to feed the holder a single step, the material feeding means comprising first and second ratchet wheels connected to drive the holder in opposite directions, a pawl carrier reciprocable by the saw advancing and retracting means to execute an idle stroke as the saw is advanced and an active or feeding stroke as the saw is retracted, alternatively active first and second feed pawls supported on the pawl carrier, the first engageable with the first ratchet wheel to feed the holder in one direction and the second engageable with the second ratchet wheel to feed the holder in the opposite direction, and means for shifting the pawl carrier in one direction to render the first pawl and ratchet wheel active and in the opposite direction to render the second pawl and ratchet wheel active.

4. A machine as set forth in claim 3 in which means are provided for facilitating the substitution of ratchet wheels having various tooth spacings so that uniform feeding steps consonant with the chosen saw diameter may be automatically effected.

5. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, the material feeding means comprising first and second ratchet wheels connected to drive the holder in opposite directions, a pawl carrier reciprocable by the saw advancing and retracting means to execute an idle stroke as the saw is advanced and an active or feeding stroke as the saw is retracted, alternatively active first and second feed pawls supported on the pawl carrier, the first engageable with the first ratchet wheel to feed the holder in one direction and the second engageable with the second ratchet wheel to feed the holder in the opposite direction, means for shifting the carrier in one direction to render the first pawl and ratchet wheel active and in the opposite direction to render the second pawl and ratchet wheel active, first and second anti-back-feed pawls connected with one another and engageable respectively with the first and second ratchet wheels, and means automatically to render the first anti-back-feed pawl ineffective when the second ratchet wheel is active and automatically to render the second anti-back-feed pawl ineffective when the first ratchet wheel is active.

6. A machine as set forth in claim 5 in which means are provided for facilitating the substitution of ratchet wheels having various tooth spacings so that uniform feeding steps consonant with the chosen saw diameter may be automatically effected, and adjustable means for limiting engagement of the active feed pawl with the active ratchet wheel to a desired length of travel so that a single tooth space advance of the active ratchet wheel will be effected at each feeding step regardless of the tooth spacing of the ratchet wheel chosen.

7. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, the material feeding means comprising first and second ratchet wheels connected to drive the holder in opposite directions, a pawl carrier reciprocable by the saw advancing and retracting means to execute an idle stroke as the saw is advanced and an active or feeding stroke as the saw is retracted, alternatively active first and second feed pawls supported on the pawl carrier, the first engageable with the first ratchet wheel to feed the holder in one direction and the second engageable with the second ratchet wheel to feed the holder in the opposite direction, means responsive to travel of the holder at the end of a row of cuttings to feed the holder crosswise into position for producing an adjacent row of cuttings, and means for concurrently shifting the feed pawl carrier to reverse the direction of drive of the holder.

8. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, and means automatically effective at each of two opposite limits of travel of the holder to reverse the direction of feeding in a row and automatically to effect a cross-feed of the holder into position to start a new row.

9. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, means automatically effective at each of two opposite limits of travel of the holder to reverse the direction of feeding in a row and automatically to effect a cross-feed of the holder into position to start a new row, and means included in the first feeding means for causing the feeding steps of the second row to be so staggered relative to the first that the cutting centers of the second row are equidistant from the nearest cutting centers of the first row.

10. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, means automatically effective at each of two opposite limits of travel of the holder to reverse the direction of feeding in a row and automatically to effect a cross-feed of the holder into position to start a new row, the first feeding means being so related to the saw that each step in a row is not less than the sum of the internal and external cutting radii of the saw, and is not more than the external cutting diameter of the saw, and the second feeding means being so related to the saw that the distance from each cutting center of the fresh row to the nearest cutting center or centers of the preceding row is not less than the sum of the internal and external cutting radii of the saw, and is not more than the external diameter of the saw, whereby the sheet is completely reduced row by row to button blanks, chips, shavings and dust.

11. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, the material feeding means comprising first and second ratchet wheels connected to drive the holder in opposite directions, a pawl carrier reciprocable by the saw advancing and retracting means to execute an idle stroke as the saw is advanced and an active or feeding stroke as the saw is retracted, alternatively active first and second feed pawls supported on the pawl carrier, the first engageable with the first ratchet wheel to feed the holder in one direction and the second engageable with the second ratchet wheel to feed the holder in the opposite direction, means responsive to travel of the holder at the end of each row of cuttings to feed the holder crosswise into position for producing an adjacent row of cuttings, and means for concurrently shifting the feed pawl carrier to reverse the direction of drive of the holder, at least one of the ratchet wheels being connected to its output shaft through an adjustable drive train through which an out-of-phase condition of one-half a feeding step can be maintained between the ratchet wheels so that the cuttings of each row will be substantially a half-step out of line with the cuttings of neighboring rows.

12. A machine as set forth in claim 11 in which an adjustable drive train consists of micrometric adjusting and locking means for securing the associated ratchet wheel precisely in different desired angular relations to its output shaft according to the length of feeding step chosen.

13. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, the material feeding means comprising first and second ratchet wheels connected to drive the holder in opposite directions, a pawl carrier reciprocable by the saw advancing and retracting means to execute an idle stroke as the saw is advanced and an active or feeding stroke as the saw is retracted, alternatively active first and second feed pawls supported on the carrier, the first engageable with the first ratchet wheel to feed the holder in one direction and the second engageable with the second ratchet wheel to feed the holder in the opposite direction, the carrier being shiftable in one direction to render the first pawl and ratchet wheel active and in the opposite direction to render the second pawl and ratchet wheel active, shafts supporting the respective ratchet wheels and having driven connections therewith, sprockets on the respective shafts, and a chain trained on said sprockets and connected at its opposite ends to the work material holder.

14. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, the material feeding means comprising first and second ratchet wheels connected to drive the clamp in opposite directions, a pawl carrier reciprocable by the saw advancing and retracting means to execute an idle stroke as the saw is advanced and an active or feeding stroke as the saw is retracted, alternatively active first and second pawls supported on the carrier, the first engageable with the first ratchet wheel to feed the holder in one direction and the second engageable with the second ratchet wheel to feed the holder in the opposite direction, the carrier being shiftable in one direction to render the first pawl and ratchet wheel active and in the opposite direction to render the second pawl and ratchet wheel active, shafts supporting the respective ratchet wheels and having driven connections therewith, sprockets on the respective shafts, a chain trained on said sprockets and connected at its opposite ends to the work material holder, and means for micrometrically adjusting the setting of one of the ratchet wheels circumferentially of its shaft to assure a desired out-of-phase relationship between the ratchet feed in one direction and the ratchet feed in the opposite direction.

15. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, the material feeding means comprising first and second ratchet wheels connected to drive the holder in opposite directions, a pawl carrier reciprocable by the saw advancing and retracting means to execute an idle stroke as the saw is advanced and an active or feeding stroke as the saw is retracted, alternatively active first and second pawls supported on the carrier, the first engageable with the first ratchet wheel to feed the holder in one direction and the second engageable with the second ratchet wheel to feed the holder in the opposite direction, means responsive to travel of the holder at the end of a row of cuttings to feed the holder crosswise into position for producing an adjacent row of cuttings, and means for concurrently shifting the feed pawl carrier to reverse the direction of drive of the holder, the means for effecting cross-feeding and the means for effecting reversal of feed being adjustable in position for actuation after the work has passed clear of the saw so that the reversal and cross-feeding can be effected while the machine is "sawing air" and completely free of any possible interference between the saw and the sheet of work material.

16. A machine for automatically sawing button blanks from sheet material, comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, means automatically effective at each of two opposite limits of travel of the holder to reverse the direction of feeding in a row and automatically to effect a cross-feed of the holder into position to start a new row, and means automatically responsive to a final attempted cross-feed when the sheet has been practically exhausted, to arrest the machine with the saw in fully retracted position.

17. A machine as set forth in claim 15 in which the cross-feed mechanism is normally locked against manual operation, and in which manually operable interlocking means is provided for unlocking the cross-feed and simultaneously, compulsorily preventing advance of the saw and the longitudinal feeding of the sheet holder while the holder is being manually unlocked and retracted to initial position, said interlocking means being automatically effective to re-lock the cross-feed as an incident of its manual operation to re-establish the operativeness of the saw and of the longitudinal feeding means.

18. A machine for cutting button blanks from plastic sheet material, comprising the combination with a tubular saw located at a cutting station and means for alternately advancing the saw upward and retracting it downward, of a sheet holder, means for positively feeding the holder to progress the sheet longitudinally step by step past the cutting station in one direction and then the other with an intervening cross-feed step, means forming an enclosure at the cutting station for confining the cut shavings, dust and chips, and vacuum means for withdrawing and collecting the shavings, dust and chips formed at the cutting station.

19. A machine as set forth in claim 18 in which the enclosure forming means comprises sheets of flexible, resilient material disposed above and below the plastic sheet path in substantially edge-to-edge relation, said sheets being yieldingly engageable with opposite faces of the plastic sheet at the cutting station.

20. A machine as set forth in claim 18 in which the source of suction is connected with the enclosure at the cutting station by a conduit and which further includes a damper disposed across the conduit, the damper being formed with perforations to pass the air, dust and shavings at all times, the perforations being too small, however, to pass the smallest button blanks, means for automatically ejecting a button from the saw after each cutting at a time when the saw is retracted from cutting position, and damper controlling means automatically causing the damper to be open during cutting but closed during ejection of the button.

21. A machine as set forth in claim 20 in which the ejector comprises a plunger within the saw and having a limited capacity for axial movement relative thereto, and air blast means effective to drive the plunger sharply upward for ejecting the blank.

22. A machine for cutting button blanks from plastic sheet material, comprising the combination with a tubular saw located at a cutting station and means for alternately advancing the saw upward and retracting it downward, of a sheet holder, means for positively feeding the holder to progress the sheet longitudinally step by step past the cutting station in one direction and then the other with an intervening cross-feed step, a body at the cutting station having a lower face of substantial area disposed in the feed plane of the upper face of the plastic sheet and directly opposed to the saw for resisting upward yielding of the plastic sheet in response to upward thrust of the saw, and means for cooperating with said body to clamp the plastic sheet against movement from a time just before the saw reaches the plastic sheet until the saw has cleared it, the arrangement being such that the sheet is securely clamped against movement during cutting but is unimpeded during operation of the holder feeding means.

23. A machine for cutting button blanks from plastic sheet material, comprising the combination with a tubular saw located at a cutting station and means for alternately advancing the saw upward and retracting it downward, of a sheet holder, means for positively feeding the holder to progress the sheet longitudinally step by step past the cutting station in one direction and then the other with an intervening cross-feed step, a body at the cutting station having a lower face of substantial area disposed in the feed plane of the upper face of the plastic sheet and directly opposed to the saw for resisting upward yielding of the plastic sheet in response to upward thrust of the saw, and means for cooperating with said body to clamp the plastic sheet against movement from a time just before the saw reaches the plastic sheet until the saw has cleared it, the arrangement being such that the sheet is securely clamped against movement during cutting but is unimpeded during operation of the holder feeding means, the body for restraining upward movement of the plastic sheet and clamping it in fixed relation being of material which is sufficiently soft to be sawed into by the saw without detriment to the saw, so that the saw when sawing the first button blank may form its own backpeg, and when sawing all blanks may pass through and beyond the plastic sheet by a purely sawing action, without forming a substantial burr or tear.

24. A machine for sawing button blanks from sheet material comprising, in combination, a holder for positively controlling the sheet material, a tubular saw, means for automatically advancing the saw through the sheet material and retracting it in alternation, means for feeding the sheet holder a step during each retractive stroke of the saw, said feeding means comprising a first ratchet wheel, a first feed pawl, and a first anti-back-feed pawl cooperative with one another for effecting feed of the holder in one direction, a second ratchet wheel, a second feed pawl, and a second anti-back-feed pawl cooperative with one another for effecting feed of the work holder in the opposite direction, means constantly operatively connecting both ratchet wheels with the holder, and with one another, and means automatically disabling the first feed pawl and the first anti-back-feed pawl while rendering the second feed pawl and the second anti-back-feed pawl active at one limit of movement of the holder, and automatically disabling the second feed pawl and the second anti-back-feed pawl while rendering the first feed pawl and the first anti-back-feed pawl active at the opposite limit of movement of the holder.

25. A machine for automatically sawing button blanks from sheet material comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, the advancing and retracting means comprising an air cylinder and a piston reciprocable therein, and means for adjusting the rate of advance of the saw by the air cylinder to accommodate the machine to various operating conditions.

26. A machine for automatically sawing button blanks from sheet material comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, means for mounting tubular saws of different diameters according to the diameter of blank desired, and means for adjusting the length of a feeding step in accordance with the diameter of the saw chosen to cause the sheet material to be consumed without substantial avoidable waste.

27. A machine for automatically sawing button blanks from sheet material comprising, in combination, a tubular saw, a sheet material holder, means for feeding the sheet material holder step by step to advance the sheet material along a prescribed path, means for advancing and retracting the saw in alternation to execute a series of blank cutting cycles, means responsive to the advancing and retracting means during the retracting phase of each cycle to feed the holder a single step, the holder feeding means being so related to the saw that each feeding step is not less than the sum of the external and internal cutting radii of the saw and not greater than the exernal diameter of the saw, whereby the sheet is caused to be progressively reduced in width by the cutting of each row.

28. A machine for automatically sawing button blanks from sheet material until the sheet is substantially consumed, comprising, in combination, a tubular saw, a sheet material holder, means for feeding the sheet material holder step by step to advance the sheet along a prescribed path, means for advancing and retracting the saw in alternation to execute a series of blank cutting cycles, means responsive to the saw advancing and retracting means during the retracting phase of each cutting cycle to feed the holder a single step, and means automatically effective at predetermined points in the movement of the holder to reverse the direction of step by step movement of the holder.

29. A machine for automatically sawing button blanks from sheet material comprising, in combination, a vertically disposed tubular saw, a sheet material holder, a horizontal supporting table for the sheet material, means for feeding the sheet material holder horizontally step by step to carry the horizontally supported material along the supporting table, means for advancing and retracting the saw vertically to execute a series of blank cutting cycles, and means responsive to the saw advancing and retracting means during the retractive phase of each cycle to feed the holder a single step.

30. A machine for automatically sawing button blanks from sheet material comprising, in combination, a tubular saw, a sheet material holder, means including ratchet wheels and actuating pawls for feeding the sheet material holder step by step in one direction and then in the opposite direction, means for advancing and retracting the saw in alternation to execute a series of blank cutting cycles, and means responsive to the advancing and retracting means during the retracting phase of each cycle to cause the holder to be fed a single step.

31. A machine for automatically sawing button blanks from sheet material comprising, in combination, a tubular saw, a sheet material holder, means for advancing and retracting the saw in alternation to effectuate a series of blank cutting cycles, and means responsive to the advancing and retracting means automatically to feed the work holder back and forth step by step through successive rows and from row to row until the material sheet is substantially consumed.

32. A machine for automatically sawing button blanks from sheet material comprising, in combination, a tubular saw, a holder for a material sheet of substantial length and breadth, means for advancing and retracting the saw in alternation to execute a series of blank cutting cycles, and means for automatically relatively moving the saw and the material holder until the sheet has been effectively converted to button blanks.

33. A machine for automatically cutting button blanks from sheet material comprising, in combination, a reciprocable blank cutting member, a holder for a material sheet of substantial length and breadth, means for advancing and retracting the blank cutting member in alternation to execute a series of blank cutting cycles, and means for automatically relatively moving the blank cutting member and the material holder until the sheet has been effectively converted to button blanks.

References Cited in the file of this patent

UNITED STATES PATENTS

| | | |
|---|---|---|
| 628,981 | Griffin | July 18, 1899 |
| 1,036,857 | Keane | Aug. 27, 1912 |
| 1,558,254 | Dusha et al. | Oct. 20, 1925 |
| 1,559,717 | Lippincott | Nov. 3, 1925 |
| 1,713,695 | Gleich | May 21, 1929 |

FOREIGN PATENTS

| | | |
|---|---|---|
| 488,333 | Canada | Nov. 25, 1952 |

UNITED STATES PATENT OFFICE

CERTIFICATE OF CORRECTION

Patent No. 2,866,368                                               December 30, 1958

Milan R. Ostrow

It is hereby certified that error appears in the printed specification of the above numbered patent requiring correction and that the said Letters Patent should read as corrected below.

Column 20, line 23, for "sewing" read -- sawing --.

Signed and sealed this 9th day of June 1959.

(SEAL)
Attest:

KARL H. AXLINE                                               ROBERT C. WATSON
Attesting Officer                                           Commissioner of Patents